United States Patent [19]

Mochida et al.

[11] Patent Number: 4,672,375
[45] Date of Patent: Jun. 9, 1987

[54] KEYLESS ENTRY SYSTEM FOR AUTOMOTIVE DEVICES WITH COMPACT, PORTABLE WIRELESS CODE TRANSMITTER, AND FEATURE FOR PREVENTING USERS FROM LOCKING TRANSMITTER IN VEHICLE

[75] Inventors: Haruo Mochida, Kiyokawa; Kinichiro Nakano; Mikio Takeuchi, both of Zama; Motoki Hirano, Yokohama, all of Japan

[73] Assignee: Nissan Motor Company, Limited, Yokohama, Japan

[21] Appl. No.: 721,868

[22] Filed: Apr. 10, 1985

Related U.S. Application Data

[63] Continuation-in-part of Ser. No. 675,629, Nov. 28, 1984, abandoned.

[30] Foreign Application Priority Data

Nov. 29, 1983 [JP] Japan ............................. 58-224961
Apr. 12, 1984 [JP] Japan ............................. 59-73697

[51] Int. Cl.$^4$ .................. G06F 7/04; B60R 25/04; B60Q 1/00
[52] U.S. Cl. ...................... 340/825.31; 340/825.69; 340/52 D; 70/257; 180/287; 307/10 AT
[58] Field of Search .................. 340/825.3, 542, 52 D, 340/572, 825.32, 825.69, 63, 64, 65, 528, 825.54, 825.76, 825.31, 825.72; 70/252, 256, 257; 180/287; 307/10 AT

[56] References Cited

U.S. PATENT DOCUMENTS

| | | | |
|---|---|---|---|
| 3,196,440 | 7/1965 | Weinstein | 340/825.72 |
| 3,656,098 | 4/1972 | Duren et al. | 340/52 D |
| 3,723,967 | 2/1973 | Atkins et al. | 340/64 |
| 3,830,332 | 8/1974 | Fontaine | 70/257 |
| 3,866,168 | 2/1975 | McGuirk, Jr. | 307/10 AT |
| 3,891,980 | 6/1975 | Lewis et al. | 340/572 |
| 4,004,273 | 1/1977 | Kalogerson | 180/287 |
| 4,137,985 | 2/1979 | Winchell | 307/10 AT |
| 4,205,325 | 5/1980 | Haygood et al. | 340/825.32 |
| 4,249,161 | 2/1981 | Mohnhaupt | 340/52 D |
| 4,291,237 | 9/1981 | Kitano | 180/287 |

FOREIGN PATENT DOCUMENTS

| | | |
|---|---|---|
| 0064602 | 11/1982 | European Pat. Off. ............. 70/257 |
| 0088490 | 9/1983 | European Pat. Off. |
| 3137260 | 4/1983 | Fed. Rep. of Germany |
| 0123538 | 9/1980 | Japan ............................. 340/52 D |
| WO80/01477 | 7/1980 | World Int. Prop. O. |

Primary Examiner—Ulysses Weldon
Assistant Examiner—Ralph Smith
Attorney, Agent, or Firm—Schwartz, Jeffery, Schwaab, Mack, Blumenthal & Evans

[57] ABSTRACT

A keyless entry system allows operation of various vehicle devices including a door lock without using a mechanical key, such as an ignition key. The system comprises a wireless, portable transmitter adapted to produce a radio signal indicative of a unique code preset in the transmitter, and a controller mounted on the vehicle and associated with the vehicle devices. The controller has a preset code to compare with the unique code indicative in the radio signal transmitted from the transmitter. The controller also detects impending or accomplished locking of the transmitter in the vehicle and produces an alarm and subsequently disables the keyless entry system unless the transmitter is removed from the vehicle within a given period of time after the alarm is given.

35 Claims, 30 Drawing Figures

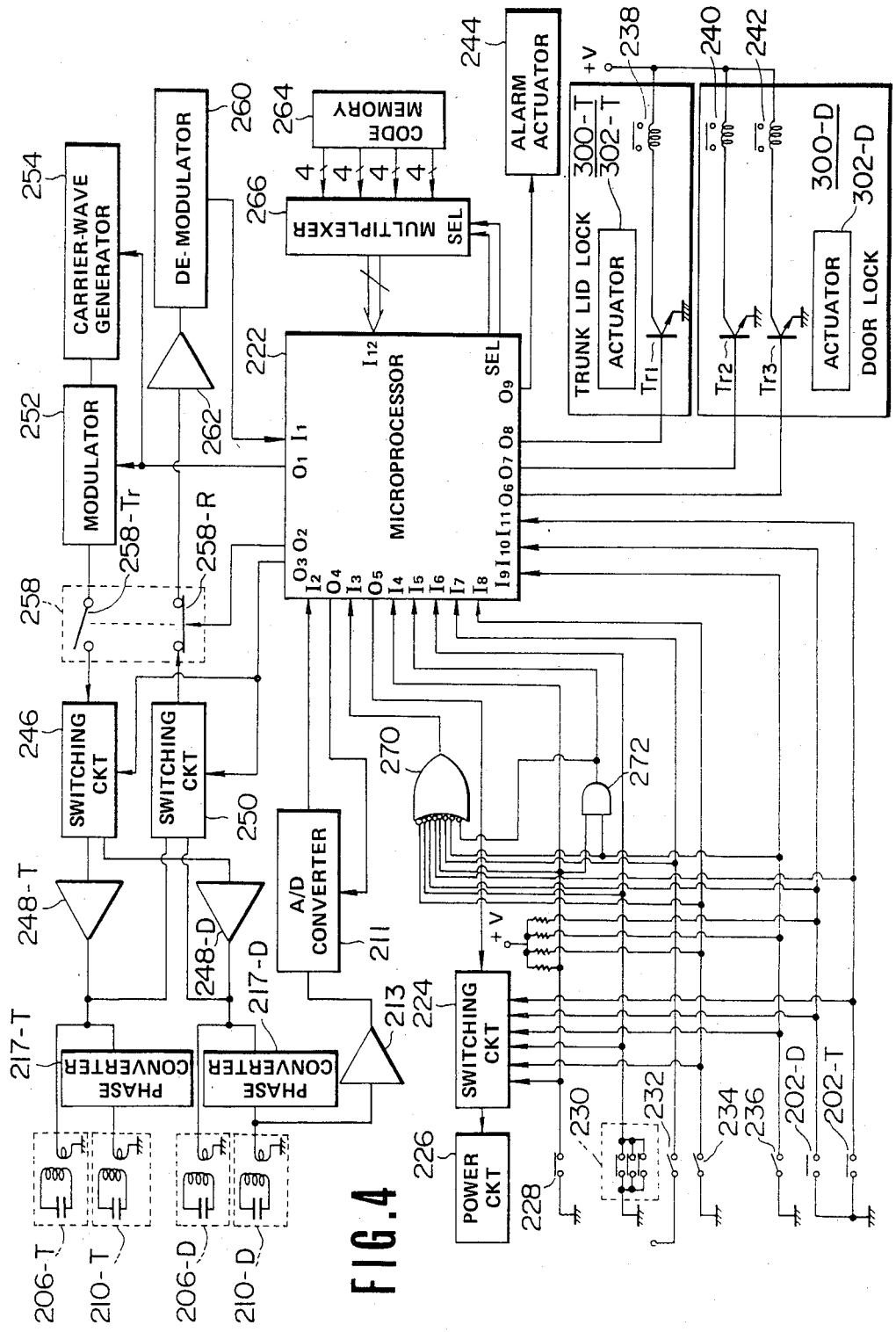

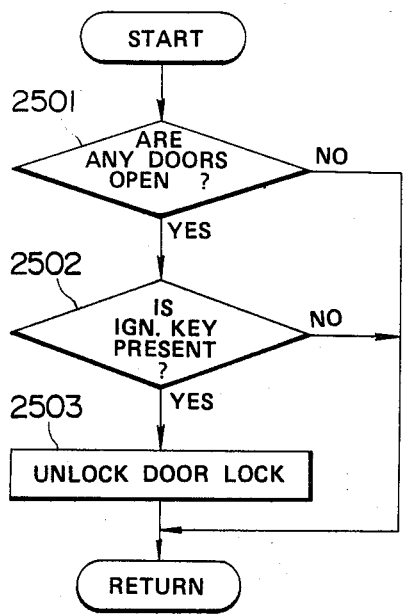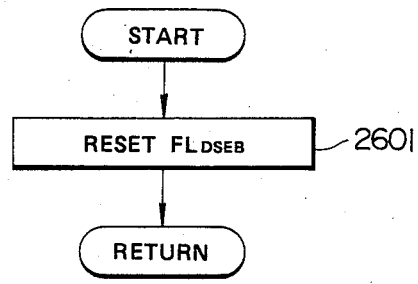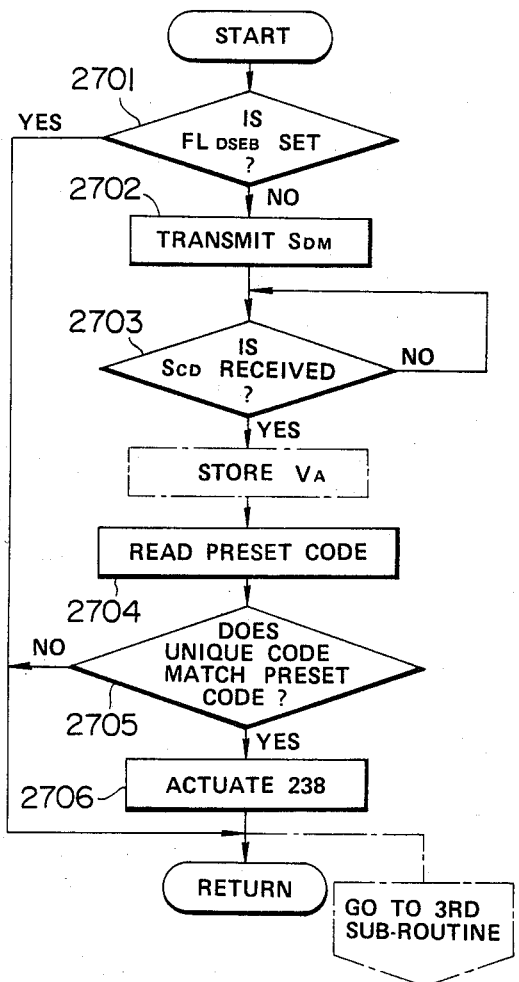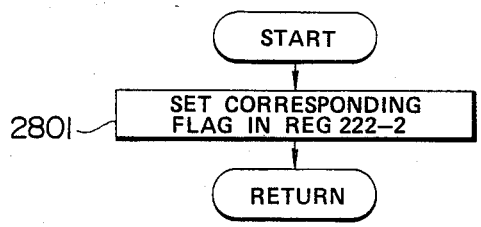

FIG.24
(A)
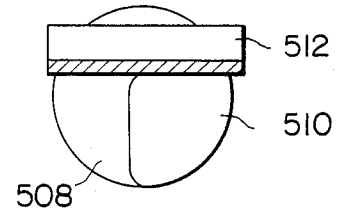
FIG.23
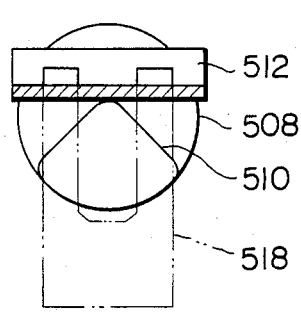
(B)
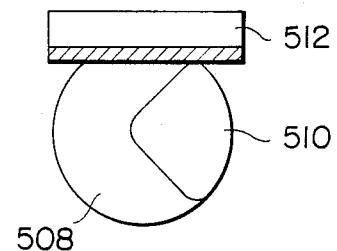
(C)
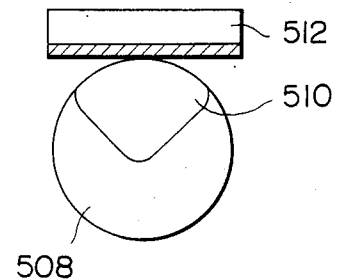

KEYLESS ENTRY SYSTEM FOR AUTOMOTIVE DEVICES WITH COMPACT, PORTABLE WIRELESS CODE TRANSMITTER, AND FEATURE FOR PREVENTING USERS FROM LOCKING TRANSMITTER IN VEHICLE

CROSS REFERENCE OF THE RELATED APPLICATION

This is a continuation-in-part application of U.S. patent application, Ser. No. 675,629, filed on Nov. 28, 1984, which is now abandoned.

BACKGROUND OF THE INVENTION

The present invention relates generally to a keyless entry system for operating automotive vehicle devices such as door locks, a trunk lid lock, a glove box lid lock, a steering column lock and/or a starter motor, without using any mechanical keys, such an ignition key. More specifically, the invention relates to a keyless entry system which includes a compact, pocket-portable wireless code transmitter of a size comparable to a creditcard, and a feature for preventing the transmitter from being locked in the vehicle.

Conventionally, automotive door locks, trunk lid locks, glove box lid locks, steering lock devices and so forth have been operated by means of ignition or other mechanical keys. Recently, so-called "Keyless Entry Systems", which do not require keys to operate door locks, trunk locks, vehicle window regulators and so forth, have been developed. In such keyless entry systems, a keyboard is provided on the external surface of the vehicle body to allow entry of a preset code authorizing access to one of more desired vehicle devices. The designated vehicle devices are electrically operated when the entered code matches a preset code.

U.S. Pat. No. 4,205,325, to Haygood et al, discloses a keyless entry system for an automotive vehicle permitting a plurality of operations to be achieved from outside of the vehicle by one who is knowledgeable of preset digital codes. Functions such as unlocking the vehicle doors, opening the trunk lid, opening windows, operating the sun-roof or programming the system with a user-preferred digital access code can all be performed by proper sequential operation of a digital keyboard mounted on the outside of the vehicle.

This and other conventional keyless entry systems require the user to accurately input the preset code through the keyboard. Although such keyless entry systems have been well developed and considered useful for eliminating the need for mechanical keys, a serious problem may occur when the user of the vehicle forgets the preset code. If the user is outside of the vehicle and the vehicle door lock device is holding the door locked, the user cannot unlock the door lock until he remembers the preset code.

In order to resolve this defect in the prior art and allow convenient use of the keyless entry system, there has been proposed a new approach in which a pocket-portable wireless transmitter, of a size comparable to a creditcard and thus capable of being carried in clothing pockets, is used to identify users authorized to operate vehicle devices. This new keyless entry system has been disclosed in the Published Japanese Patent Application (Tokkai) No. Showa 59-24075, published on Feb. 7, 1984, (Japanese Patent Application No. 57-132118, filed on July 30, 1982. In the disclosed system, door locks, a trunk lid lock and so forth can be operated with a single push-botton action. The wireless transmitter always becomes active in response to operation or depression of any one of the push buttons to operate to desired vehicle device. This means that whoever possesses the transmitter has full access to the vehicle and that whenever the transmitter is near enough to the vehicle, keyless entry is possible for any one at all. As a result, if the user should lock the transmitter in the vehicle and leave the vehicle, anyone would be able to unlock the door, turn on the starter motor and steal the vehicle. In addition, it would be highly likely for items stored in the trunk and/or glove box to be stolen when the transmitter is left in the vehicle.

In order to avoid these problems due to locking the transmitter in the vehicle, an alarm system for notifying the user when the transmitter is about to be left in the vehicle has been proposed in the co-pending U.S. patent application Ser. No. 651,785 filed on Sept. 18, 1984, and assigned to the common assignee to the present invention.

SUMMARY OF THE INVENTION

The present invention is generally an improvement of the feature for preventing the transmitter from being locked in the vehicle.

Therefore, it is an object of the present invention is to provide a keyless entry system which disables keyless entry operations when the wireless transmitter is recognized to be locked in the vehicle.

Another object of the invention is to provide a keyless entry system which detects the presence of the transmitter in the vehicle and distinguishes whether or not the transmitter is accompanied in the vehicle by the user so as to disable the keyless entry operation only when the transmitter is recognized as having been left in the vehicle.

A further object of the invention is to provide a keyless entry system which additionally facilitates automatic locking of steering when a predetermined steering lock condition is satisfied.

In order to accomplish the above-mentioned and other objects of the invention, a keyless entry system, according to the present invention, comprises a portable wireless transmitter adapted to transmit a unique code-indicative radio signal encoded to carry a preset unique code stored in the transmitter, a controller mounted on the vehicle and adapted to receive the unique code-indicative radio signal, compare the received unique code with a second preset code, and produce a control signal only when the received unique code matches the second preset code, actuators, each associated with corresponding vehicle devices for operating the latter to desired operting states, manual switches, each adapted to signal the keyless entry system to operate a corresponding one of the vehicle devices, a first detector for detecting whether or not a vehicle door or doors is closed, a second detector for detecting whether or not the door lock is locked, and a disabling means which becomes active when the vehicle door is closed and the door lock is locked, and responding, when active, to reception of the unique code-indicative signal for a period of time longer than a predetermined period of time to disable operation of the controller, the disabling means detecting the presence of a user in the vehicle and remaining inactive when the presence of a user in the vehicle is detected.

For instance, according to the present invention, the transmitter is recognized as having been locked in the vehicle when the doors are all closed and locked and the unique code-indicative signal transmitted by the transmitter does not disappear within a predetermined period of time. In order to prevent erroneous indication of the transmitter being locked in the vehicle, manual operation of the door locks is distinguished from keyless operation.

Preferably, the disabling means stops operating when any door is unlocked. While the keyless entry operation is disabled, the doors may be unlocked by conventional mechanical keys, such as an ignition key. Accordingly, the keyless entry system should be used in conjunctional with a conventional mechanical key-operated system.

The keyless entry system, according to the invention, may be associated with a steering lock device. The steering lock device includes an electrically operated actuator for operating the steering lock device between locking and unlocking positions. Steering locking and unlocking operation is triggered by a predetermined vehicle operation, such as closing of the vehicular doors. A predetermined steering lock condition is checked as triggered the steering locking and unlocking operation. Steering locking and unlocking operation is carried out when the operation is triggered and the steering lock condition is satisfied.

BRIEF DESCRIPTION OF THE DRAWINGS

The present invention will be understood more fully from the detailed description given herebelow and from the accompanying drawings of the preferred embodiment of the present invention, which, however, should not be taken to limit the invention to the specific embodiment but are for explanation and understanding only.

In the drawings:

FIG. 4 is a schematic circuit diagram of a controller in the preferred embodiment of the keyless entry system of FIG. 2;

FIG. 14 is a flowchart of a fourth sub-routine of the main program of FIG. 10;

FIG. 15 is a flowchart of the fifth sub-routine of the main program of FIG. 10;

FIG. 16 is a flowchart of a sixth sub-routine of the main program of FIG. 10;

FIG. 17 is a flowchart of an interrupt program executed by interrupting execution of the main program and/or subroutines of FIGS. 10 to 16;

FIG. 23 is a side elevation of a locking rod in the steering lock device of FIG. 21;

FIGS. 24A to 24C respectively show relationship of the locking rod o FIG. 23 and a rotor, in various operations positions;

DESCRIPTION OF THE PREFERRED EMBODIMENT

Figure 1:
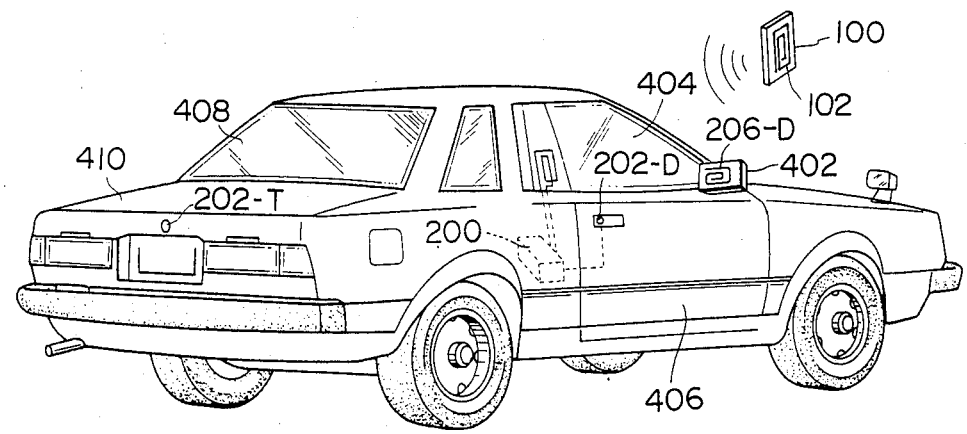
FIG. 1 is a perspective view of a vehicle to which a preferred embodiment of a keyless entry system in accordance with the present invention is applied.
Figure 2:
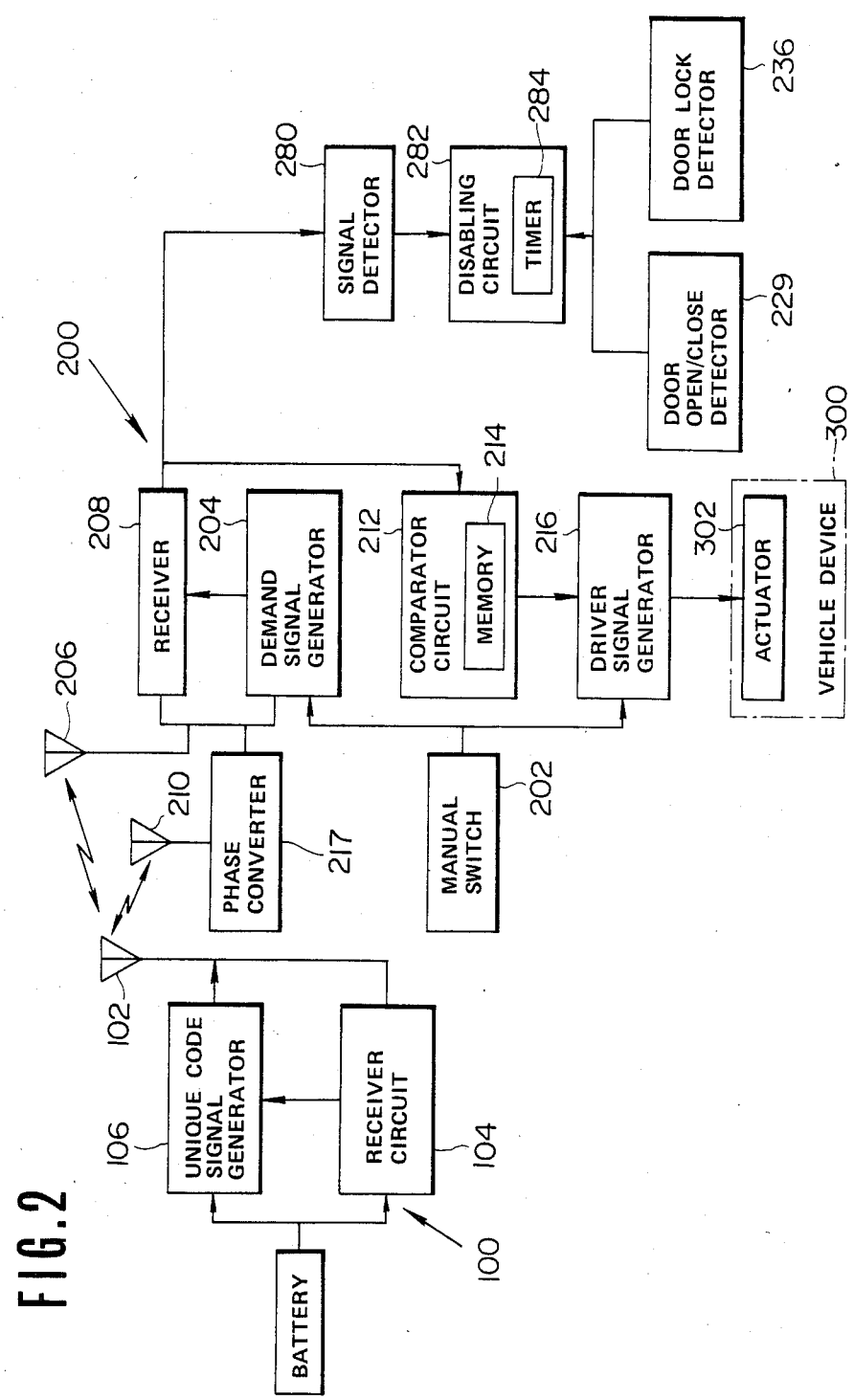
FIG. 2 is a block diagram showing the general circuit arrangement of the preferred embodiment of the keyless entry system according to the invention.

Referring now to the drawings, FIGS. 1 and 2 show the general structure of the preferred embodiment of a keyless entry system according to the present invention. As shown in FIG. 1, the preferred embodiment of the keyless entry system of the present invention generally comprises a compact wireless transmitter 100 which is comparable in size with common bank or creditcards and so can be easily carried in a clothing pocket, and a controller 200 mounted on a vehicle. The controller 200 is connected with push-button-type manual switches 202 mounted on the outer surface of the vehicle body. The manual switches 202 are each located near the corresponding vehicle devices. In the embodiment shown, the keyless entry system is designed to operate a door lock and a trunk lid lock. Therefore, the manual switch 202-D for the door lock is mounted on the vehicle door 406. On the other hand, the manual switch 202-T for the trunk lid lock is mounted on the trunk lid 410 or at an appropriate location near the trunk lid lock.

The transmitter 100 has a thin, rectangular casing on which a loop antenna 102 is provided. A loop antenna 206-D is mounted near enough the manual switch 202-D for the user to be able to depress the manual switch 202-D while holding the transmitter 100 within broadcast range of the loop antenna 206-D.

The fundamental idea of the present invention will be discussed with reference to FIG. 2. The manual switch 202 serves to request operation of the vehicle device 300. The controller 200 is responsive to depression of the manual switch 202 to produce a radio signal at a specific frequency which will be hereafter referred to as "demand signal". A demand signal generator 204 in the controller produces the demand signal in response to depression of the manual switch 202. The demand signal is transmitted by a transmitter antenna 206. The transmitter antenna 206 may be mounted on the external surface of the vehicle body near the vehicle device 300 to be operated. For example, if the vehicle device 300 to be operated were the left-front door lock, the transmitter antenna 206 might then be mounted on the window pane of the left-front door or on a mirror mounted on the left-front door. In practice, the transmitter antenna 206 will be a loop-antenna printed on the chosen area of the vehicle.

The transmitter 100 also has a transmitter/receiver antenna 102 which may be a loop-antenna printed on the outer surface of a transmitter casing. The antenna 102 is connected to a receiver circuit 104 of the transmitter 100 to receive the demand signal from the controller. The receiver circuit 104 is, in turn, connected to a unique signal generator 106 which generates a radio signal indicative of a unique combination of several digits in binary code. The radio signal produced by the unique signal generator 106 will be referred to hereafter as "unique code signal". The code indicated by the unique code signal is unique for each transmitter and serves to identify the transmitter 100. The unique code signal of the unique code signal generator 106 is transmitted by the antenna 102.

A receiver 208 with a receiver antenna 210 is provided in the controller to receive the unique code signal from the transmitter 100. The receiver antenna 210 is also mounted on the external surface of the vehicle body near the transmitter antenna 206. The receiver 208 is connected to the demand signal generator 204 and responsive to the demand signal to be activated for a predetermined period of time. In other words, the receiver 208 is active for the predetermined period of time after the demand signal is transmitted. Signals received within the predetermined period of time are converted into binary code signals indicative of any and all digits encoded in the signal as they would be in the transmitter 100. The receiver 208 sends the converted binary code signal to a comparator circuit 212. The comparator circuit 212 includes a memory 214 storing a preset code which matches the unique code of the transmitter 100. The comparator circuit 212 compares the binary-coded digits from the receiver 208 with the preset code and produces a trigger signal when the codes match. A driver signal generator 216 is responsive to the trigger signal produced by the comparator circuit 212 to produce a driver signal for an actuator 302 in the vehicle device.

In cases where the keyless entry system is adapted to operate more than one vehicle device, the driver signal generator 216 is also connected to the manual switches 202 so as to be able to operate the corresponding vehicle devices. The driver signal generator 216 recognizes which of the manual switches 202 is operated and sends a driver signal to the actuator of the corresponding vehicle device.

In the aforementioned arrangement, the transmitter 100 uses a small, long-life battery 11 as a power source. In practice, a mercury battery or its equivalent could be used in the transmitter. On the other hand, the controller 200 uses a vehicle battery 218 as a power source. The aforementioned keyless entry system according to the present invention achieves conservation of battery power by being operative only when the manual switch is operated. It would be convenient to provide a weak battery alarm in the system. A suitable weak battery-alarm feature for a keyless entry system has been disclosed in the co-pending U.S. patent application Ser. No. 651,783 filed on Sept. 18, 1984, commonly assigned to the assignee of the present invention. The disclosure of this co-pending U.S. patent application is hereby incorporated by reference for the sake of disclosure.

The receiver 208 is also connected to a signal detector 280 which detects reception of the unique code signal from the transmitter 100. The signal detector 280 sends a detector signal to a disabling circuit 282 as long as the presence of the unique code signal is detected. The disabling circuit 282 is also connected to a door closure detector 229 and a door lock detecting switch 236. The disabling circuit 282 incorporates a timer 284 for measuring elapsed time from operation or depression of the one of the manual switches 202-D or 202-T. The disabling circuit 282 responds to the presence of the detector signal after a predetermined period of time, given that all of the doors are closed and locked as indicated by the door closure detector and the door lock detecting switch, to produce a disabling signal. The disabling signal disables production of the driver signal by the driver signal generator 216. On the other hand, while the driver signal generator 216 is disabled, the disabling circuit 282 is responsive to opening of one of the doors to stop the disabling signal and resume keyless entry operation.

In summary, the transmitter is recognized to be locked in the vehicle when all of the doors are closed and locked and the unique code signal from the transmitter is received continuously for a period longer than a preset period of time. The preset period of time is determined empirically such that the period is long enough for the user to move out of transmission range but short enough that the user will still be able to hear the alarm indicating that the transmitter is about to be left in the vehicle. In order to enable the user to unlock the door in order to remove the transmitter from the vehicle, the system remains operative for a few minutes, which should be long enough for the user to return to the vehicle and to operate the manual switch for the door lock. If the user fails to notice the alarm and therefore does not operate the keyless entry system to unlock the door and remove the transmitter from the vehicle, the keyless entry system is rendered inoperative after those few minutes to inhibit keyless entry operation until the door is unlocked by means of a mechanical key.

This satisfactorily and successfully prevents the vehicle from being stolen by simple operation of the manual switch while the transmitter is in the vehicle.

The present invention will be described in more detail in terms of the preferred embodiment of the invention with reference to FIGS. 2 to 4.

Figure 3:
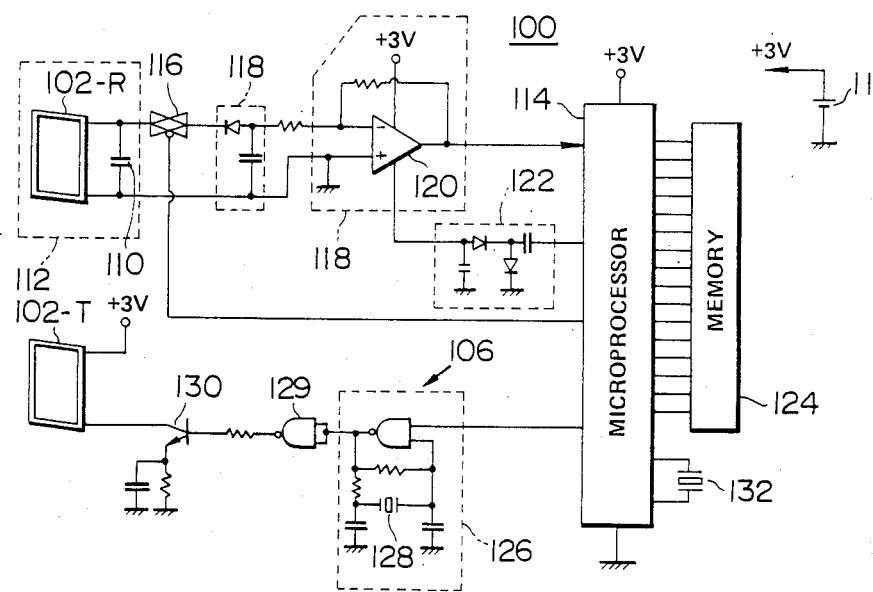
FIG. 3 is a schematic circuit diagram of a transmitter in the preferred embodiment of keyless entry system of FIG. 2.

As shown in FIGS. 2 and 3, as in the controller 200, the transmitter 100 is provided with a pair of loop antennas 102-R and 102-T which are printed on the outer surface of the transmitter casing (not shown). The antenna 102-R is connected to the receiver circuit 104 and serves as a receiver antenna. On the other hand, the antenna 102-T is connected to the unique signal generator 106 and serves as a transmitter antenna. A capacitor 110 is connected in parallel with the receiver antenna 102-R to form a passive antenna circuit 112. The antenna circuit 112 captures by electromagnetic induction the demand signal from the controller 200 produced in response to depression of one of the manual switches 202.

The antenna circuit 112 is connected to a microprocessor 114 via an analog switch 116, a detector circuit 118 and an amplifier 120. A negative power supply circuit 122 is inserted between an output terminal of the microprocessor 114 and the amplifier 120 to invert a 0 or +3 V binary pulse output from the microprocessor into a 0 to −3 V input to the amplifier. This negative power is supplied to the amplifier to adjust the bias point of the amplifier to 0 V.

The microprocessor 114 is connected to a memory 124 storing the preset unique code. In practice, the memory stores four predetermined, four-it, BCD digits. The memory 124 can be a ROM pre-masked with the preset code. However, in order to minimize the cost, it would be advantageous to use a circuit in the form of a printed circuit board including circuit elements corresponding to each bit. When the circuit element is connected, it is indicative of "1" and when the circuit element is out or disconnnected, it is indicative of "0". By this arrangement, the preset code may be input simply to the microprocessor 114.

The microprocessor 114 is adapted to be triggered by the demand signal from the controller 200, i.e., input to the microprocessor 114 through the antenna 102-R, the analog switch 116, the detector circuit 118 and the amplifier 120 serves as the trigger signal for the microprocessor. In response to the trigger signal, the microprocessor 114 reads the preset unique code from the memory 124 and sends a serial pulse-form unique code signal indicative of the unique code to a modulator 126. The modulator 126 includes a crystal oscillator 128 for generating a carrier wave for the unique code signal. In the modulator 126, the unique code signal and the carrier wave are modulated into a radio signal in which the unique code signal rides on the carrier wave. The modulated radio signal is output through a buffer 129, a high-frequency transistor 130 and a transmitter antenna 102-T.

Another crystal oscillator 132 is connected to the microprocessor 114. The oscillator 132 may serve as a clock generator for feeding a clock to the microprocessor.

In the above arrangement of the transmitter, electric power is supplied to each component by a small, long-life-type lithium cell 11 such as are used in an electronic watch. The microcomputer to be used for the transmitter 100 is of the low-voltage CMOS type. The analog switch 118 and the amplifier 120 IC units are also chosen to be of the power-saving type. As a result, stand-by operation requires only about 4 to 5 mA. This means that the transmitter 100 can be used for about one year before replacing the lithium battery.

Figure 5:
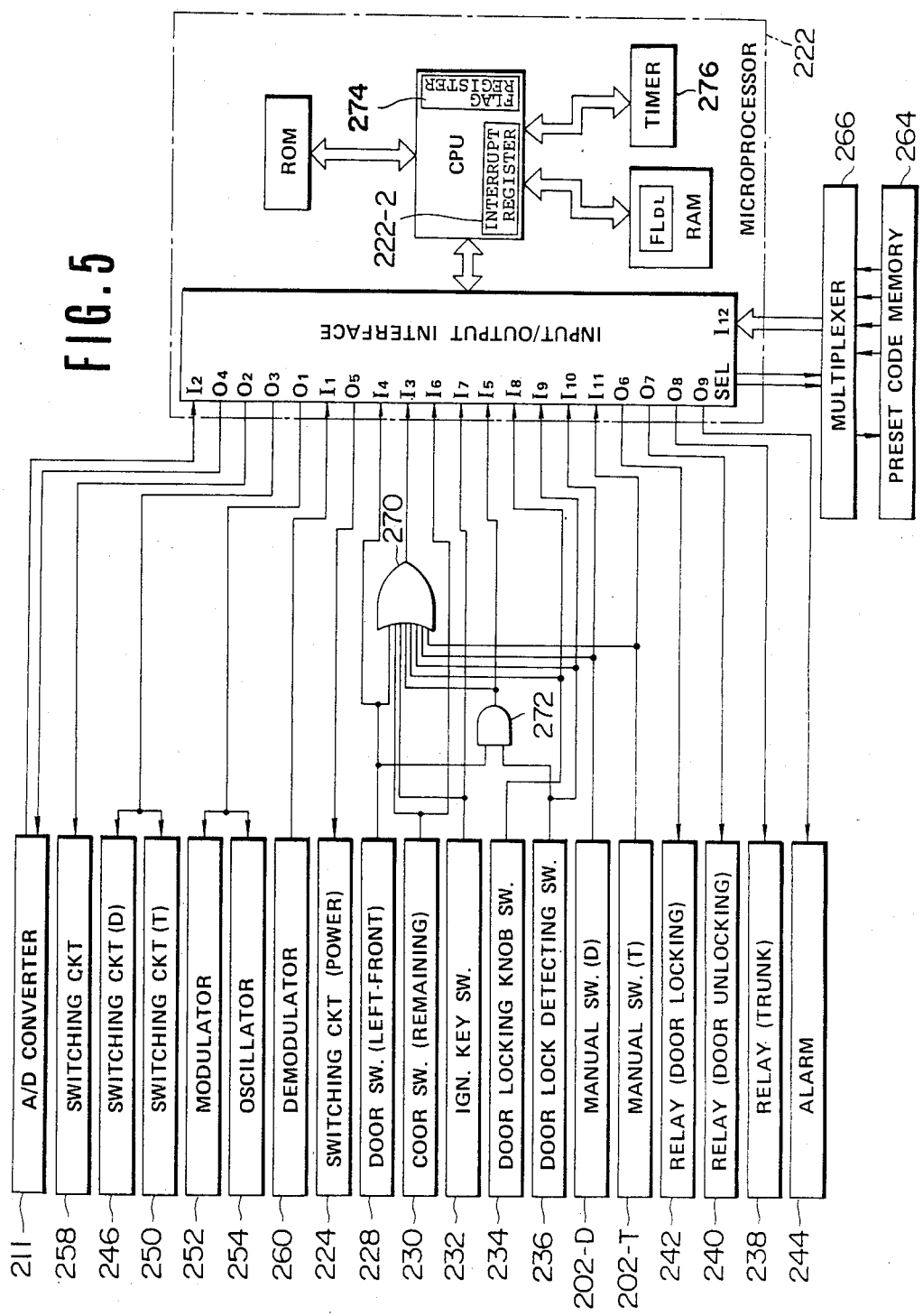
FIG. 5 is a block diagram showing details of a microprocessor in the controller of FIG. 4.

As shown in FIGS. 4 and 5, the controller 200 comprises a microprocessor 222 including an input/output interface, CPU, ROM, RAM, timer and so forth. The microprocessor 222 is connected to manual switches 202-D and 202-T. In the embodiment shown, the keyless entry system is designed to operate a door lock 300-D and a trunk-lid lock 300-T. Accordingly, the manual switch 202-D is connected to operate the door lock 300-D, and the manual switch 202-T is similarly operable when the trunk lid lock 300-T is to be operated. The manual switches 202-D and 202-T are connected to the input terminals $I_{10}$ and $I_{11}$ of the microprocessor 222. The manual switches 202-D and 202-T are also connected to a switching circuit 224 inserted between the output terminal $O_5$ of the microprocessor 222 and a power supply circuit 226.

The switching circuit 224 is also connected to a driver's door switch 228, passenger door switches 230, an ignition key switch 232, a door lock knob switch 234 and a door-lock-detecting switch 236. The driver's door switch 228 detects opening and closing of the left-front door adjacent the driver's seat and is closed while the left-front door is open. The passenger door switches 230, detects opening and closing of the right-front door and the rear doors. These switches 230 close when the corresponding door opens. The door switches are built and operated as conventionally utilized for door closure monitoring. Alternatively, it would be simpler to connect the switching circuit 224 to conventional door switches.

The ignition key switch 232 is installed within or near an ignition key cylinder and detects the presence of an ignition key in the key cylinder. The ignition key switch 232 is closed wihile the ignition key is within the key cylinder.

The door lock knob switch 234 is responsive to a manual door locking operation by which the door lock of the driver's door is manually operated in the door-locking direction. The door lock knob switch 234 closes when the door lock knob is operated manually to perform door locking. The door lock detecting switch 236 detects the locking state of the door lock; specifically the switch 236 is closed while any of the door locks are unlocked and is open when all of the door locks are in their locking positions.

The switching circuit 224 is responsive to closure of any one of the switches 202-D, 202-T, 228, 230, 232, 234 and 236 to trigger the power supply circuit 226 for a given period of time. The power supply circuit 226 is active for the given period of time to supply a vehicle battery power to the various components of the controller circuit. In addition, the switching circuit 224 is responsive to high-level output from the output terminal $O_5$ of the microprocessor 222 to be held active and thus sustain operation of the power supply circuit 226 as long as the high-level output continues. The switching circuit 224 deactivates the power supply circuit when the output level of the output terminal $O_5$ drops from high to low.

Output terminals $O_6$, $O_7$ and $O_8$ of the microprocessor 222 are respectively connected to actuator relays 242, 240 and 238 via switching transistors $Tr_3$-$Tr_1$. The actuator relay 238 is associated with an actuator 302-T of the trunk lid lock 300-T. The actuator relays 240 and 242 are associated with an actuator 302-D of the door lock 300-D. In practice, the actuator 302-D comprises a reversible motor which actuates the door lock 300-D to its locked position when driven in one direction and to its unlocked position when driven in the other direction. Two relays 240 and 242 are adapted to reverse the polarity of power supply and thus switch the driving direction of the reversible motor. For instance, when the relay 240 is energized, the reversible motor 302-D is driven in the door-unlocking direction. On the other hand, when the relay 242 is energized, the reversible motor 302-D is driven in the door-locking direction. Therefore, the output level at the output terminal $O_6$ goes high when the door is to be unlocked and the output terminal $O_7$ goes high when the door is to be locked.

The microprocessor 222 is programmed to execute a theft-preventive operation in response to a specific condition. For example, if the door switch is closed while the door lock detecting switch is open, a theft-preventive alarm signal is output via the output terminal $O_9$ which is connected to an alarm actuator 244. In practice, the alarm actuator 244 may be connected to a vehicular horn to activate the latter in response to the theft-preventive alarm signal. This theft-preventive operation in keyless entry systems has been disclosed in the European Patent First Publication No. 00 73 068, published on Mar. 2, 1983. The disclosure of this European Patent First Publication is herein incorporated by reference. On the other hand, the theft-preventive operation could be performed by the microprocessor by counting erroneous operations within a given period of time. A theft-preventive procedure in which an alarm is generated after an excessive number of erroneous entry attempts has been disclosed on the same date by the comon applicant and commonly assigned to the assignee of the present invention, which co-pending U.S. patent application is entitled "KEYLESS ENTRY SYSTEM FOR AUTOMOTIVE VEHICLE WITH POWER-CONSERVATION FEATURE", having Ser. No. 675,649, filed Nov. 28, 1984. The contents of this co-pending U.S. patent application is hereby incorporated by reference for the sake of disclosure.

Figure 6:
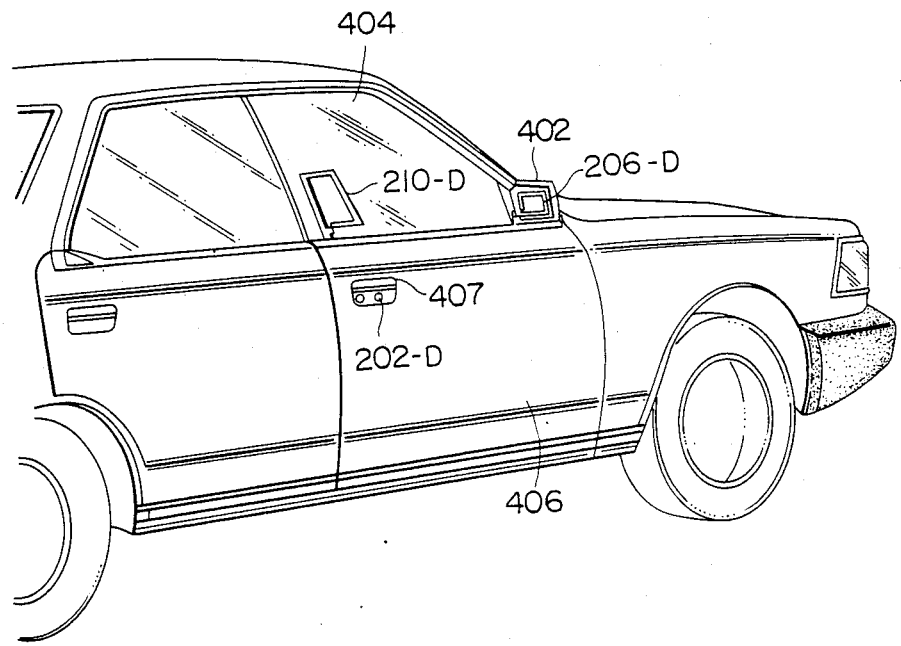
FIG. 6 is a perspective view showing a loop antenna mounted on the external surface of the vehicle body near a door lock.
Figure 8:
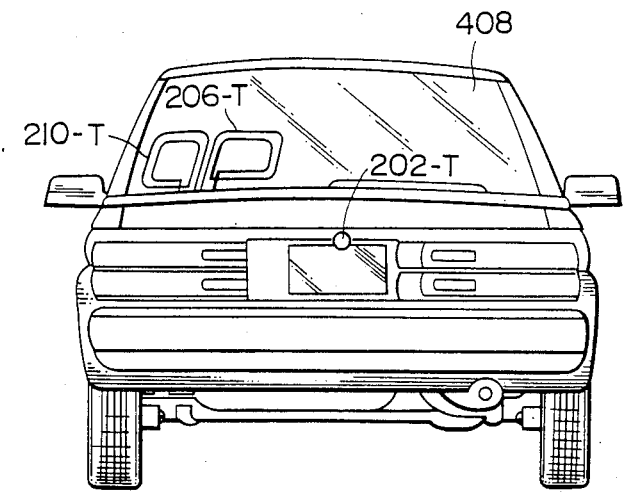
FIG. 8 is a rear view of a vehicle showing loop antennas mounted on a rear windshield near a trunk lid lock.

The antennas 206-D and 210-D in the shown embodiment are located near the door locks and the trunk lid locks. As an example, the antenna 206-D may be applied to or printed on the reflective surface of a door mirror 402, as shown in FIG. 6. The antenna 210-D may be applied to or printed on a window pane 404 of the vehicle side door 406. On the other hand, the antennas 206-T and 210-T are mounted near the trunk lid lock and may be applied to or printed on the rear windshield 408, as shown in FIG. 8.

Figure 7:
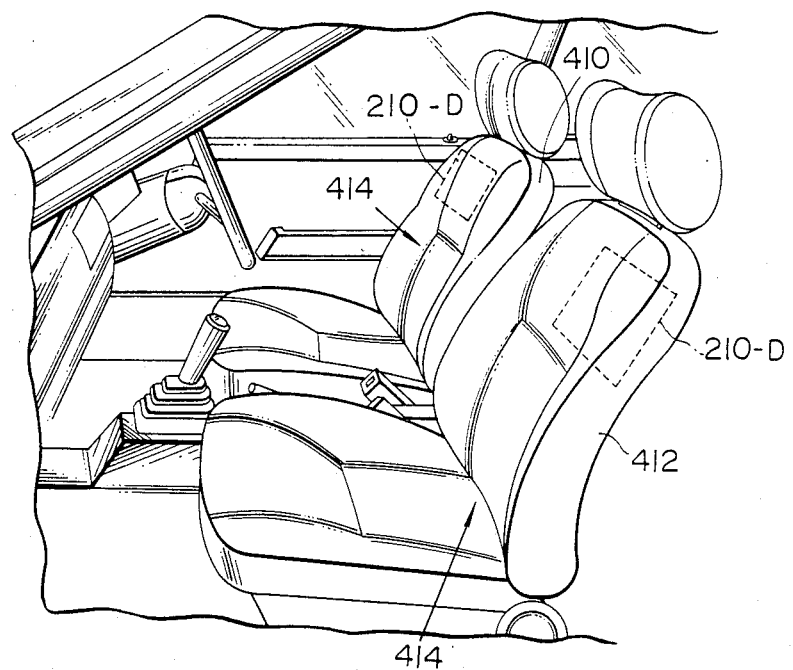
FIG. 7 is a perspective view of a vehicle showing loop antennas mounted on seat backs of front seats.

As shown in FIG. 4, the antennas 206-D and 210-D are coupled to transmit the demand signal $S_{DM}$ and receive the unique code signal $S_{CM}$ when the door lock 300-D is to be operated. The antenna 210-D is connected to a phase converter 217-D which shifts the phase of the unique code signal received via the antenna 210-D through 90°. In this embodiment, the antenna 210-D is mounted on the seat back of a vehicle seat as illustrated in FIG. 7, instead of on the side door window pane.

The antenna 210-D is also connected to an analog-to-digital converter (A/D converter) 211 through a high-frequency amplifier 213. The A/D converter 211 outputs a digital signal $S_{Rf}$ indicative of the received signal level to the input terminal $I_2$ of the microprocessor 222. The A/D converter 211 is also connected to the output terminal $O_4$ of the microprocessor 222 and is gated by a trigger signal output through the output terminal $O_4$. Similarly, the antennas 206-T and 210-T are coupled to transmit the demand signal to the transmitter 100 and receive the unique code signal in return when operation of the trunk lid lock is requested via the manual switch 202-T. The antenna 210-T is connected to a phase converter 217-T which shifts the unique code signal phase received by the antenna 210-T through 90°.

The pairs of antennas 206-D, 210-D and 206-T, 210-T are connected for input from a switching circuit 246 through respectively corresponding high-frequency amplifiers 248-D and 248-T. The switching circuit 246 selectively activates one pair of antennas 206-D, 210-D or 206-T, 210-T to transmit the demand signal $S_{DM}$. For instance, when the manual switch 202-D is depressed to produce the demand signal $S_{DM}$ for operating the door lock 300-D, the antennas 206-D and 210-D become active to transmit the demand signal to the transmitter. The signal phase of the demand signal transmitted through the antenna 210-D is shifted through 90° by means of the phase converter 217-D. On the other hand, when the manual switch 202-T is depressed, the switching circuit 246 selects the antennas 206-T and 210-T. Similarly to the above, the demand signal $S_{DM}$ is thus transmitted to the transmitter through the antennas 206-T and 210-T and the signal phase of the demand signal transmitted through the antenna 210-T is shifted through 90° by the phase converter 217-T.

The switching circuit 246 is connected for input from a modulator 252 via a switch terminal 258-Tr of a switching circuit 258. The modulator 252 is, in turn, connected for input from the output terminal $O_1$ of the microprocessor 222. Similarly, the switching circuit 250 is connected to demodulator 260 through a switch terminal 258-R of the switching circuit 258 and an amplifier 262. The switch terminals 258-Tr and 258-R are adapted to alternate so that when the switch terminal 258-Tr is closed, the switch terminal 258-R is opened, and when the switch terminal 258-R is closed, the switch terminal 258-Tr is opened. When the switch terminal 258-Tr is closed, the controller 200 operates in transmitter mode to transmit the demand signal $S_{DM}$. On the other hand, when the terminal 258-R is closed, the controller 200 operates in receiver mode to receive the unique code-indicative signal from the transmitter 100.

The demodulator 260 is connected for output to the input terminal $I_1$ of the microprocessor 222.

The switching circuits 246 and 250 are connected to the output terminal $O_3$ of the microprocessor 222. The switching circuits 246 and 250 are operated in tandem to select one pair of antennas 206-D, 210-D or 206-T, 210-T. For instance, the switching circuit 246 connects the antennas 206-D and 210-D to the modulator via the switch terminal 258-Tr of the switching circuit 258 when the door lock operating manual switch 202-D is operated. At the same time, the switching circuit 250 connects the antennas 206-D and 210-D to the demodulator 260 through the switch terminal 258-R and the amplifier 262. Alternatively, when the trunk lid lock operating manual switch 202-T is operated, the switching circuit 246 connects the antennas 206-T and 210-T to the modulator 252 through the switch terminal 258-Tr and the switching circuit 150 connects the antennas 206-T and 210-T to the demodulator 260 via the switch terminal 258-R and the amplifier 262.

The modulator 252 is associated with an oscillator 254 which serves as a carrier-wave generator. The modulator 252 is triggered by the output at the output terminal $O_1$ of the microprocessor 222 to activate the carrier-wave generator 254 which then provides the fixed-frequency carrier wave. The modulator 252 modulates the carrier wave in accordance with the output from the terminal $O_1$ to generate the demand signal $S_{DM}$ and then transmits same through the selected pair of antennas 206-D, 210-D or 206-T, 210-T. The demodulator 260 is adapted to separate the carrier wave component from the received unique code signal $S_{CD}$ so as to convert the radio signal into a binary signal representative of the unique code stored in the transmitter 100. The demodulator 260 applies the encoded binary signal to the input terminal $I_1$ of the microprocessor 222.

The microprocessor 222 is triggered by the input at the input terminals $I_1$ via the demodulator 260 to read a preset code from a preset code memory 264 via a multiplexer 266. The microprocessor 222 compares the unique code with the preset code read from the preset code memory 264 to judge whether the transmitter 100 identified by the unique code corresponds to the controller 200 and so is authorized to operate the vehicle devices. The microprocessor 222 outputs a driver signal through one of the output terminals $O_6$, $O_7$ and $O_8$ corresponding to the operated manual switch so as to operate the corresponding vehicle device, i.e. door lock or trunk lid lock, when the unique code matches the preset code.

It would be convenient for the preset code memory 264 to be an external memory connectable to the terminal of the multiplexer 266. In this case, the preset code memory 264 could be stored with the corresponding transmitter 100 as a separate unit. The preset code memory 264 and the transmitter 100 would be added to the vehicle upon sale so that the separate memory-and-transmitter unit would not be separated from the matching controller. In practice, the preset code memory is programmed by shorting some of a plurality of individual bit cells so as to have a binary output corresponding to the unique code.

The switching circuit 258 is connected to the output terminal $O_2$ of the microprocessor 222 through which a state change-over signal is output. The state change-over signal is indicative of whether the system is transmitting the demand signal or receiving the unique code-indicative radio signal from the transmitter 100. In practice, the microprocessor 222 keeps the switching circuit 250 in the transmitting state for a given period of time in response to depression of one of the manual switches. Thereafter, the microprocessor 222 then switches the switching circuit 250 to the receiving state. Similarly to the switching circuit 246, the switching circuit 250 is connected to the output terminal $O_3$ of the microprocessor 222 to activate one of the antennas 210-D and 210-T according to which manual switch was depressed.

As will be seen from FIG. 4, the door switches 228 and 230, the ignition key switch 232, the door lock knob switch 234 and the door lock detecting switch 236 are respectively connected to the microprocessor 222 through input terminals $I_4$, $I_6$, $I_7$, $I_8$ and $I_9$.

Figure 9:
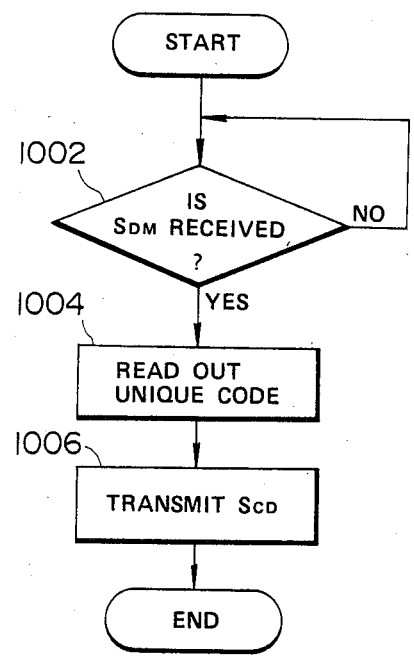
FIG. 9 is a flowchart of a program executed by a microprocessor in the transmitter of FIG. 3.

FIG. 9 illustrates the operation of the transmitter 100 in the form of a flowchart for a program executed by the microprocessor 114. The microprocessor 114 repeatedly executes the program of FIG. 9. An initial block 1002 checks for reception of the demand signal SDM. Execution of the block 1002 loops until the demand signal SDM is received through the antenna 102. Upon receipt of the demand signal SDM at the block 1002, control passes to a block 1004. In the block 1004, the preset unique code is read from the code memory 124. At a block 1006, a carrier wave produced by a carrier-wave generator 254 is modulated by the unique code signal generator 106 in accordance with the retrieved code to produce the unique code signal. The modulated unique code signal SCD is then transmitted through the antenna 102 to the controller 200 mounted on the vehicle. As set forth above, according to the embodiment shown, the transmitter 100 is designed to consume minimal electric power, particularly during stand-by operation at the block 1002. This minimizes the drain on the battery and thus prolongs its life time.

Figure 10:
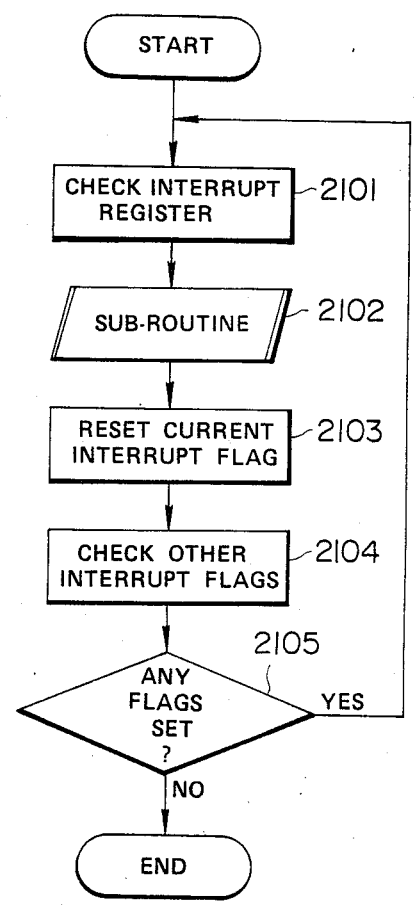
FIG. 10 is a flowchart of a main program to be executed by the microprocessor of the controller of FIGS. 4 and 5.

FIGS. 10 to 16 illustrate control programs to be executed by the microprocessor 222 of the controller 200. The programs illustrated in FIGS. 11 to 16 are sub-routines of the interrupt control program of FIG. 17. The control program of FIG. 10 is to be executed in response to a high-level input at input terminal $I_3$. In other words, if any one of the manual switches 202-D, 202-T, the driver's door switch 228, passenger door switches 230, the ignition key switch 232, the door lock knob switch 234 and the door lock detecting switch 236 is closed, the output of an OR gate 270 goes high to trigger the microprocessor 222 by way of a high-level input at the input terminal $I_3$. When triggered, the microprocessor 222 outputs a high-level signal through the output terminal $O_5$ to trigger the power supply switching circuit 224 to activate the power supply circuit 226. The output level at the output terminal $O_5$ remains high for a predetermined period of time to hold the microprocessor active.

Figure 11:
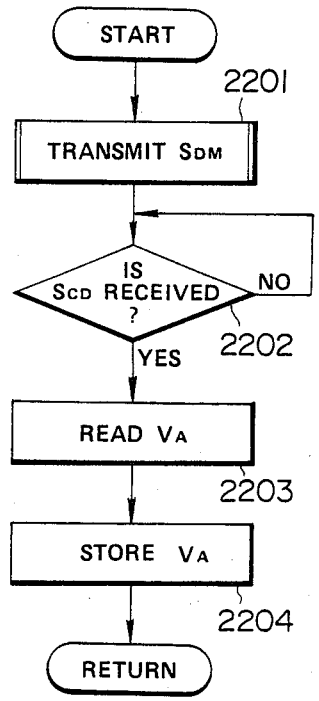
FIG. 11 is a flowchart of a first sub-routine of the main program of FIG. 10.
Figure 12:
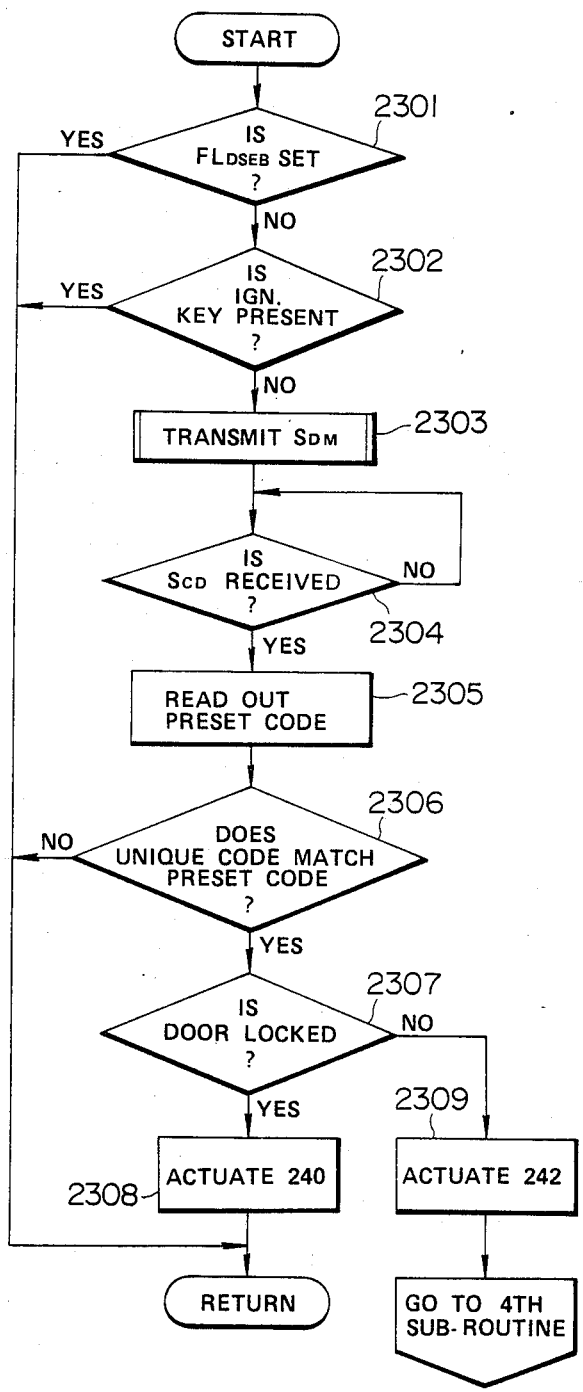
FIG. 12 is a flowchart of a second sub-routine of the main program of FIG. 10.
Figure 13:
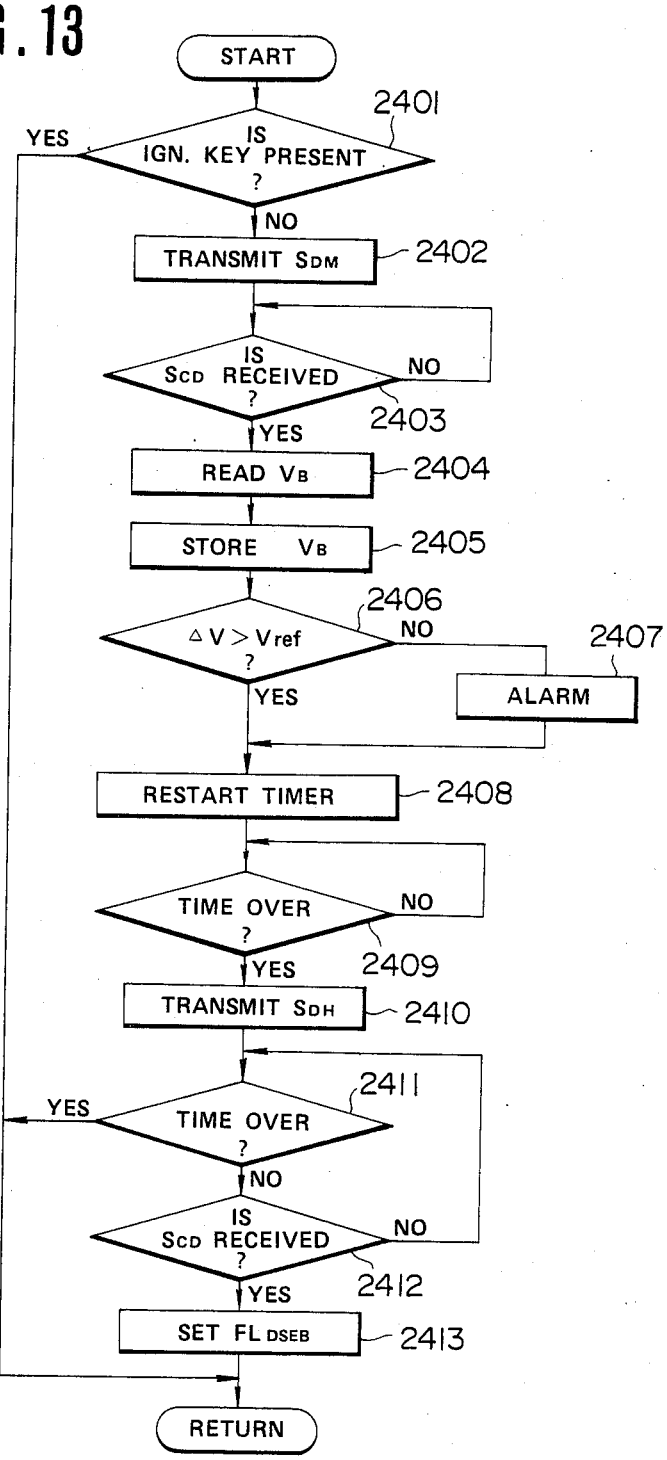
FIG. 13 is a flowchart of a third sub-routine of the main program of FIG. 10.
Figure 18:
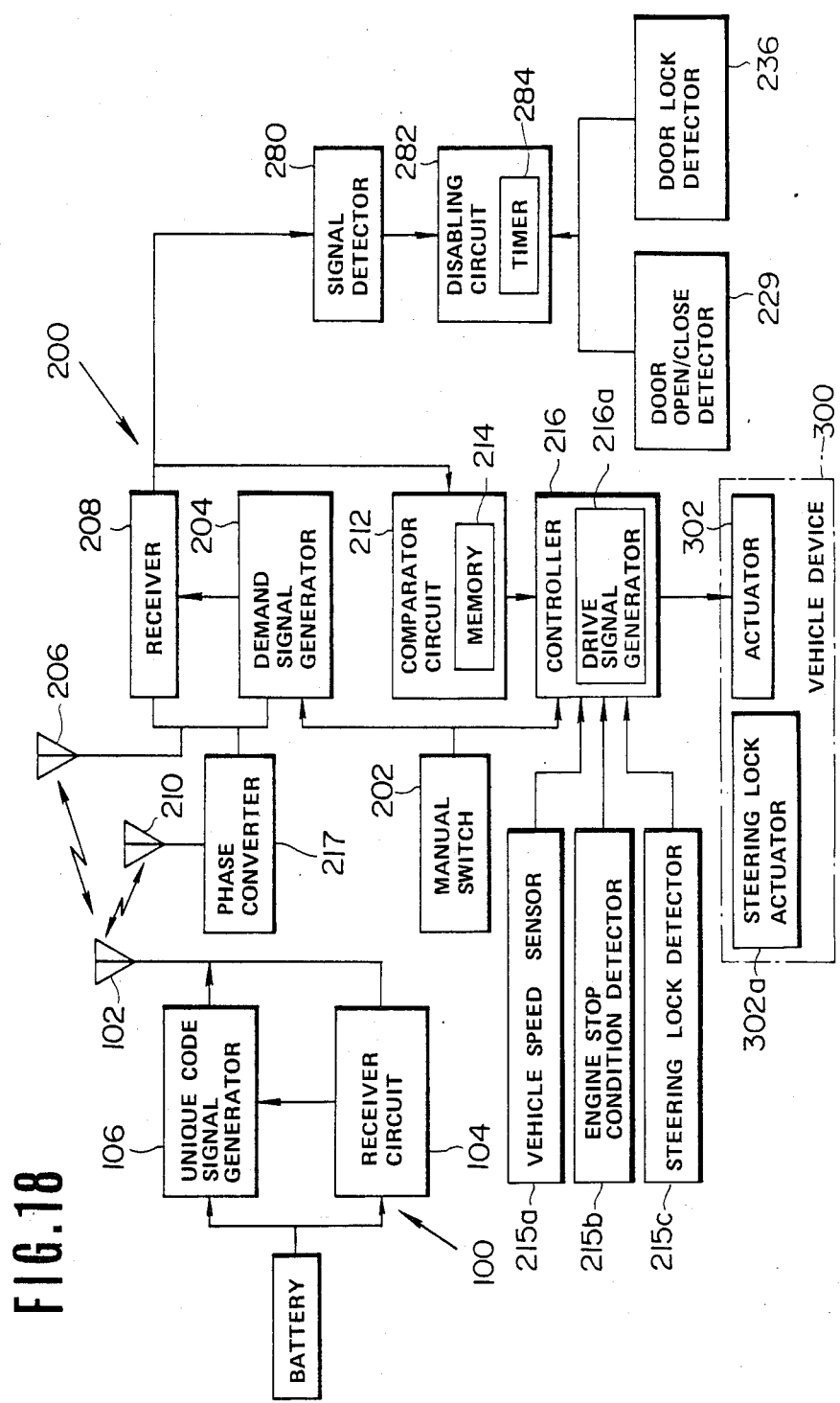
FIG. 18 is a block diagram showing the general circuit arrangement of the second embodiment of the keyless entry system according to the invention.
Figure 19:
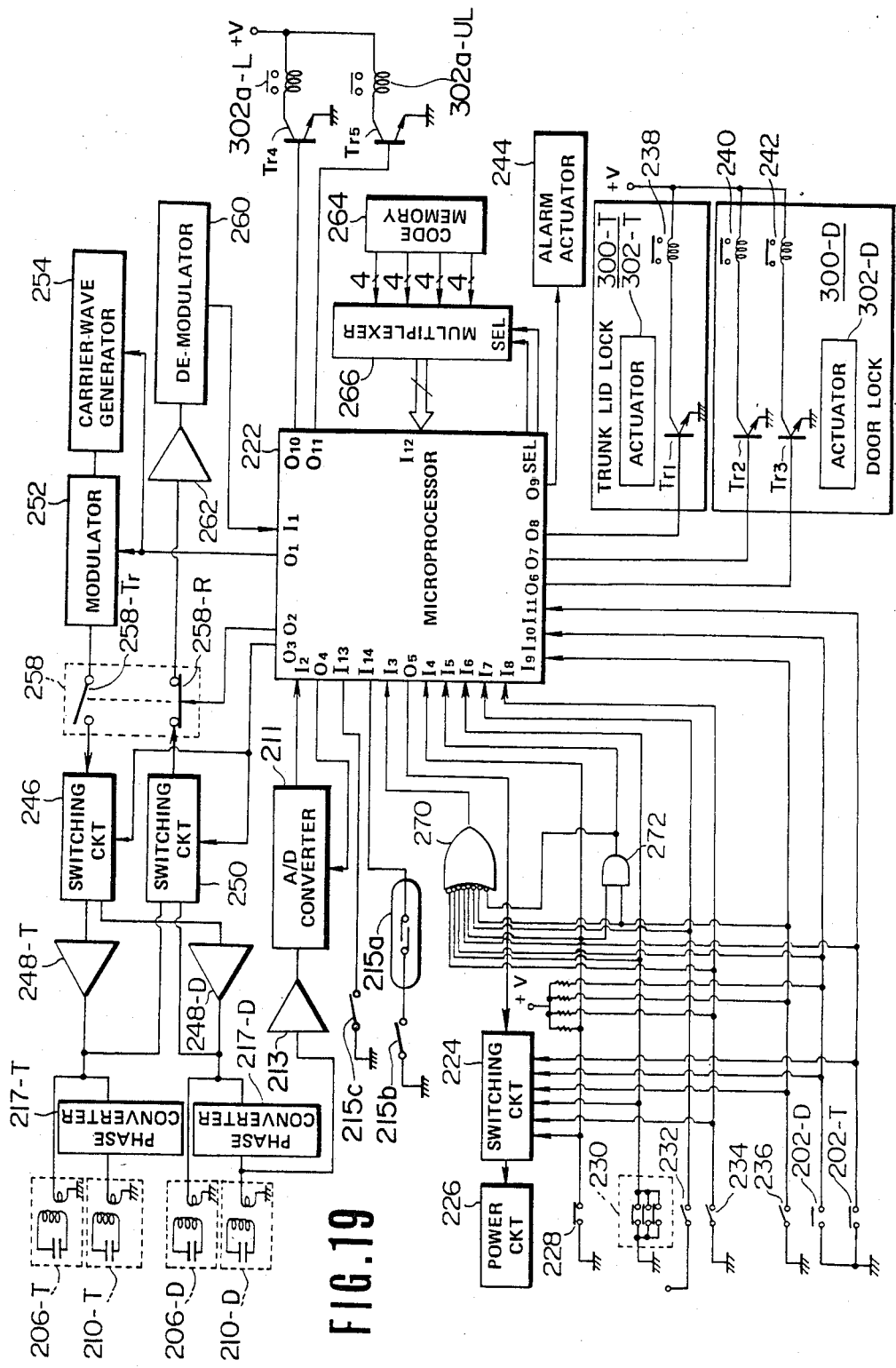
FIG. 19 is a schematic circuit diagram of a controller in the second embodiment of the keyless entry system of FIG. 18.
Figure 20:
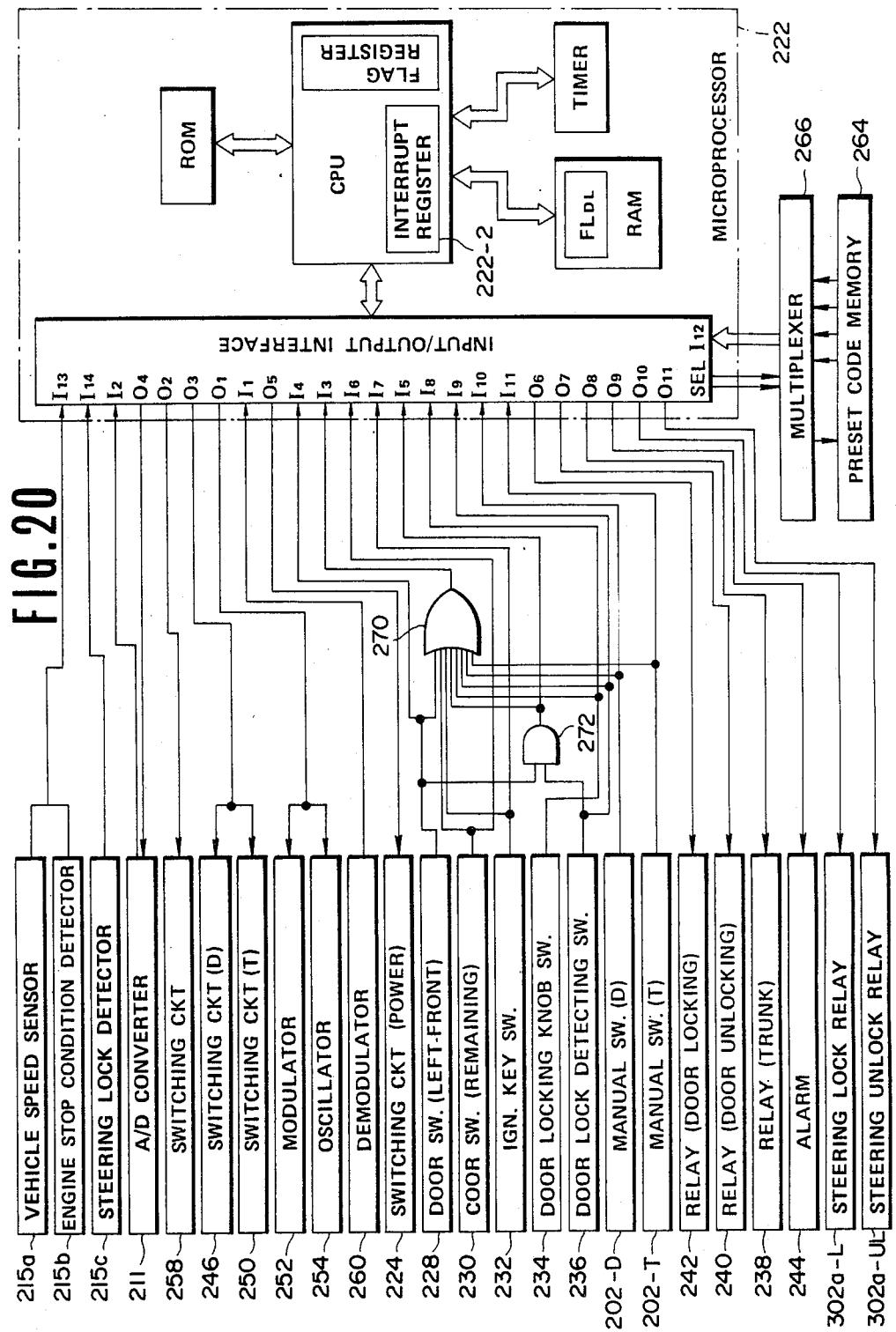
FIG. 20 is a block diagram showing details of a microprocessor in the controller of FIG. 19.
Figure 21:
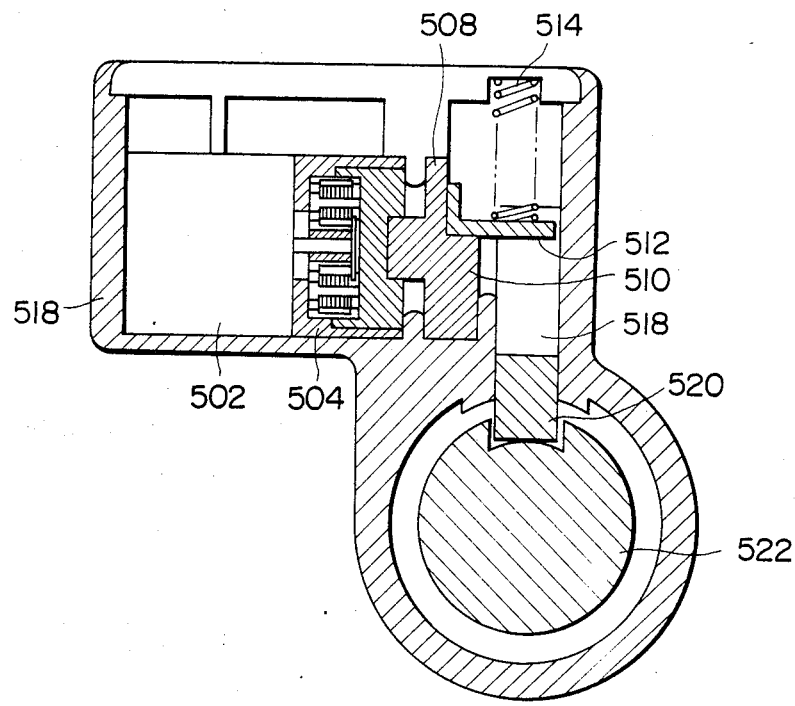
FIG. 21 is a cross-section of a steering lock device employed in the second embodiment of the keyless entry system according to the invention.
Figure 22:
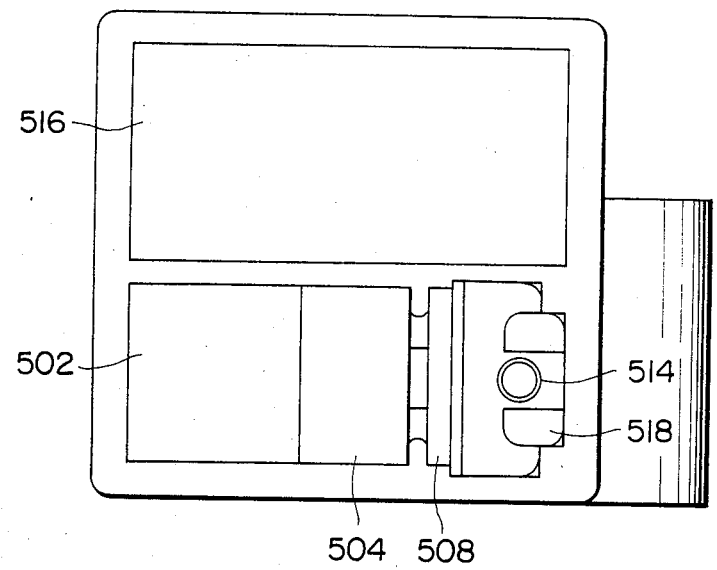
FIG. 22 is a plan view of the steering lock device of FIG. 21.
Figure 25:
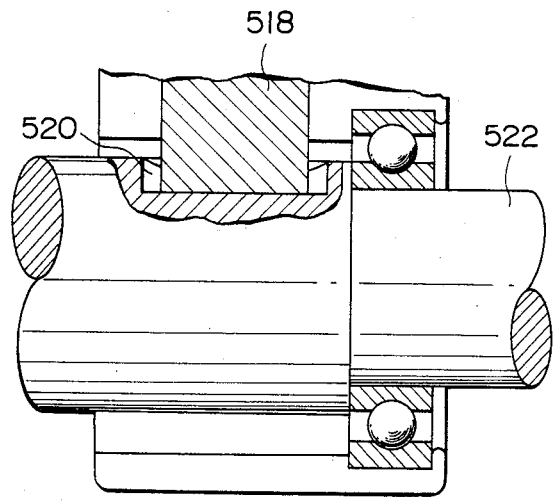
FIG. 25 is a sectional view of a steering lock device employed in the second embodiment of the invention.
Figure 26:
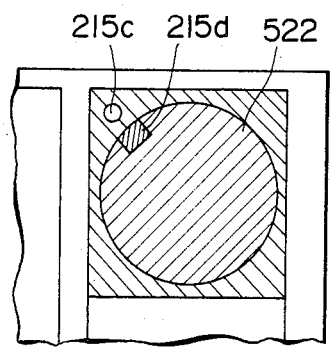
FIG. 26 is an explanatory illustration showing a steering lock detector in the keyless entry system.
Figure 27:
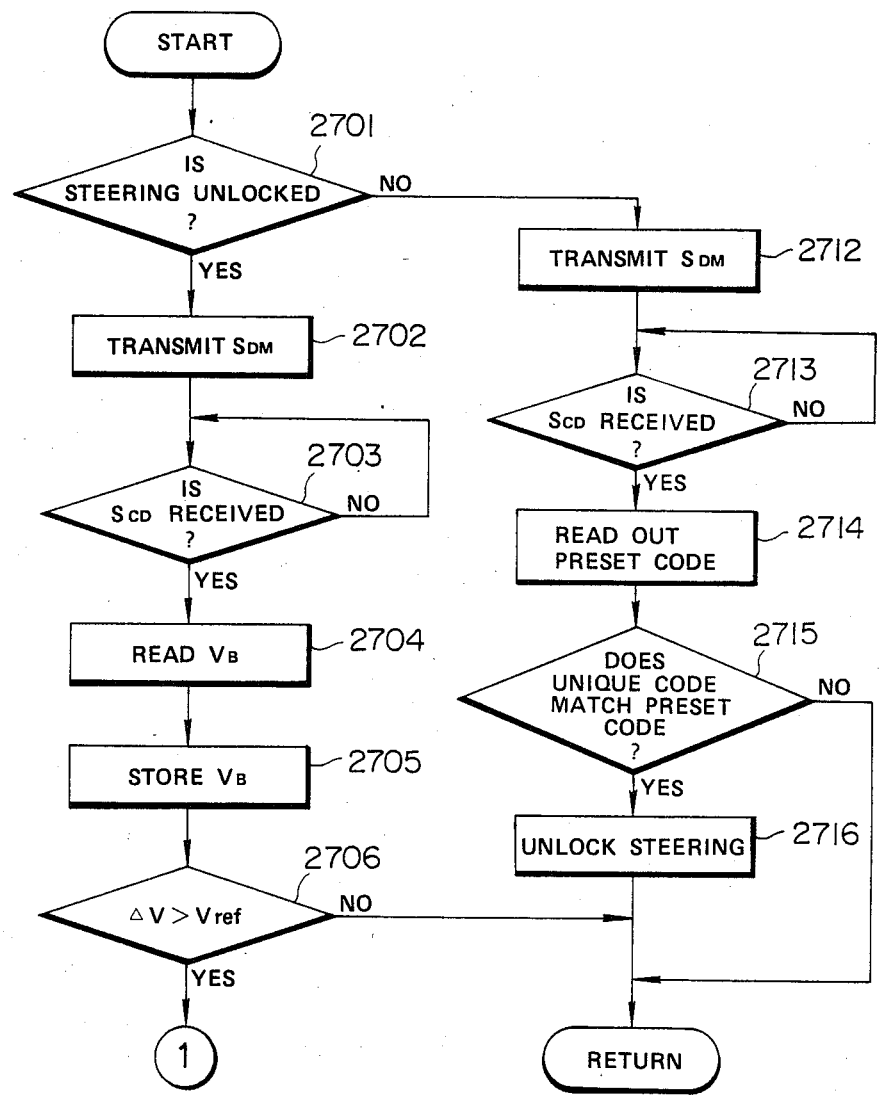
FIGS. 27 and 28 are flowcharts of a fourth subroutine of the main program of FIG. 10.
Figure 28:
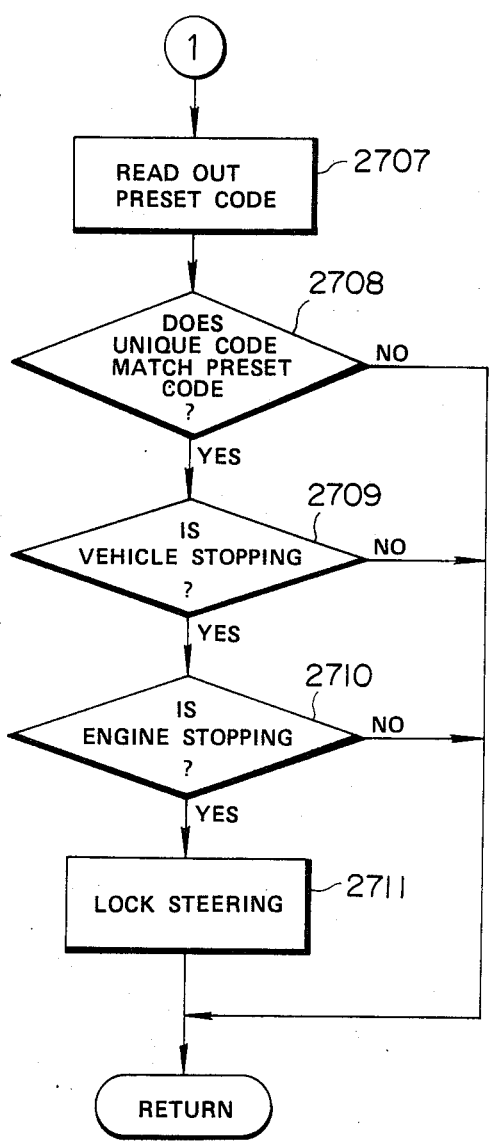

The microprocessor 222 is responsive to the onset of power supply to start execution of the control programs of FIG. 10. In practice, the control program governs selection and execution of one of the sub-routines of FIGS. 11 to 15 stored in memory block in ROM. The first sub-routine of FIG. 11 is to be executed in response to a low-level input at the input terminal $I_4$. The second sub-routine of FIG. 12 is executed in response to a low-level input at the input terminal $I_{10}$. The third sub-routine of FIG. 13 is executed in response to a high-level input at the input terminal $I_5$. The fourth sub-routine of FIG. 14 is executed when the input level at the input terminal $I_8$ goes low. The sub-routine of FIG. 15 is executed when the input level at the input terminal $I_9$ goes low.

As seen in FIG. 5, the microprocessor 222 is also provided with a conventional interrupt register 222-2 consisting of flags indicative of occurrence of triggering inputs at each the input terminals $I_4$, $I_{10}$, $I_5$, $I_8$ and $I_9$ in order of priority or occurrence of input. The contents of the register 222-2 are checked in sequence during execution of the main program following the end of each sub-routine. For instance, when the driver's door is closed, the input level at the input terminal $I_4$ goes low the interrupt flag in register 222-2 corresponding to the input terminal $I_4$ is set. This interrupt signalling method is per se well known and can be carried out in various ways. For example, as used in the preferred embodiments, interrupts may be either maskable, i.e. delayable until some other process is completed, or nonmaskable, i.e. triggering immediate execution of an associated routine in preference to all other operations.

Similarly, when the door lock operating manual switch 202-D is operated, the input level at the input terminal $I_{10}$ changes from high to low. Then, the corresponding flag in the register 222-2 is set to reflect the triggering change in input level at the input terminal $I_{10}$ to signal execution of the second sub-routine. When the driver's door is opened and the door lock is operated to the locking position in preparation for locking the door, the door lock detecting switch 236 closes and the output signal from a series-connected AND gate 272 goes low. Thus, the input level at the input terminal $I_5$ goes low, where upon the third sub-routine of FIG. 13 is executed. When the door lock is manually unlocked, the door lock knob switch 234 closes to change the input level at the input terminal $I_8$ to the low level. Then, the fourth sub-routine of FIG. 14 is executed in response thereto. When the all of the doors are locked and thus the door lock detecting switch 236 closes, the input level at the input terminal $O_9$ goes low to trigger the fifth sub-routine.

Concerning FIG. 10, at a block 2101 of the main program, the register 222-2 is checked to see if an interrupt request has been received via the input terminals $I_3$-$I_{11}$. If so, one of the sub-routines in FIGS. 11 to 15 is selected and executed at a block 2102 in accordance with the states of the flags in register 222-2.

After completing execution of the designated subroutine the flag of register 222-2 corresponding to that routine is reset at a block 2103 and then, the contents of the interrupt register 222 are again checked at a block 2104 for later or lower priority interrupts requests yet to be handled. Thereafter, at a block 2105, control returns to block 2101 if there are any interrupt flags still set, indicating a request to execute another of the subsidiary routines illustrates in FIGS. 11–16 . The loop 2101–2105 is repeated until there are no further flags set in interrupt register 222-2, whereupon the interrupt control program ends following block 2105, and control of the microprocessor 222 returns to its main program or operating system at the point following that at which the program of FIG. 10 interrupted execution.

The operation of the controller 200 during execution of each of the sub-routines of FIGS. 11 to 15 will be described in detail below.

FIG. 11 shows the first sub-routine to be executed when the driver's door is opened. Immediately after starting execution, the demand signal is produced and transmitted through the antennas 206-D and 210-D, at a block 2201. In order to select the antennas 206-D and 210-D, the output level at the output terminal $O_3$ remains low to connect the antennas 206-D and 210-D to the modulator 252 via the switch terminal 258-Tr of the switching circuit 258. At the same time, in order to operate the controller in the transmitter mode, the output level at the output terminal $O_2$ is held low to close the switch terminal 258-Tr and open the switch terminal 258-R. In response to a high-level output at the output terminal $O_1$, the modulator 252 is triggered to produce the demand signal $S_{DM}$ to be transmitted through the antennas 206-D and 210-D.

In response to the demand signal $S_{DM}$, the transmitter 100 becomes active to execute the foregoing program of FIG. 8 to transmit the unique code signal $S_{CD}$.

A block 2202 which checks for the unique code signal $S_{CD}$ is repeatedly performed until the signal $S_{CD}$ is received. During execution of the block 2202, the output level at the output terminal $O_4$ is held high to activate the A/D converter 211. After the unique code signal $S_{CD}$ is received at the block 2202, then the value $V_A$ input through the input terminal $I_2$ is read at a block 2203. The value $V_A$ is a binary signal digitalized by the A/D coverter 211 and representative of the amplitude of the received unique code signal. Thereafter, the amplitude indicative value $V_A$ is stored in an appropriate memory block in RAM at a block 2204. Then, control returns to the control program of FIG. 10.

FIG. 12 shows the second sub-routine to be executed in response to a low-level input at the input terminal $I_{10}$ caused by operating the door lock manual switch 202-D. At an initial stage of execution of the second ssubroutine, a disabling flag $FL_{DSEB}$ is checked at a block 2301, which disabling flag is set in a flag register 274 in the CPU when the controller 200 is disabled and is reset as long as the controller is enabled. If the disabling flag $FL_{DSEB}$ is set when checked at the block 2301, the routine of FIG. 12 ends immediately and control returns to the main program.

On the other hand, if the disabling flag $FL_{DSEB}$ is reset when checked at the block 2301, the presence of an ignition key (mechanical key) in the key cylinder (not shown) is checked for at a block 2302. In practice, the presence of the ignition key in the key cylinder is indicated by a high-level input at input terminal $I_7$ connected to the ignition key switch 232. If the input level at the input terminal $I_7$ is high, indicating that the ignition key is in the key cylinder, the user is judged to be in the vehicle. In this case, keyless entry operation is not to be performed and thus, control returns directly to the control program.

In the absence of the ignition key from the key cylinder the demand signal $S_{DM}$ is transmitted at a block 2303 in substantially the same manner as described with respect to the block 2201 of the first sub-routine. As set forth above, the transmission of the demand signal $S_{DM}$ continues for a predetermined period of time. The period for which the controller 200 remains in the transmitter mode is defined by a timer 276 in the microprocessor 222. After the predetermined period of time expires, the output level at the output terminal $O_2$ changed from low to high in order to open the switch terminal 258-Tr and to close the switch terminal 258-R. As a result, electrical communication between the switching circuit 246 and the modulator is blocked and the switching circuit 258 establishes electrical communication between the demodulator 260 and the latter. This switching procedure for switching the operation mode of the controller 200 may also be used in the foregoing first sub-routine and the subsequent third and sixth routines which will be discussed later.

After switching the operation mode of the controller from the transmitter mode to receiver mode, reception of the unique code signal $S_{CD}$ from the transmitter is checked for at a block 2304. This block 2304 is repeated until the unique code signal $S_{CD}$ is received.

In practice, if the unique code signal $S_{CD}$ is not received within a given waiting period, the keyless entry system would be reset to prevent endless looping. In this case, a theft-preventive counter may be incremented by one and an alarm may be produced when the counter value reaches a given value. This alarm procedure has been disclosed in the aforementioned co-pending U.S. Patent Application filed on the same date. This reception-mode time limit procedure should, in practice, be applied to all routines which await reception of the unique code-indicative signal $S_{CD}$ from transmitter 100.

Upon reception of the unique code signal $S_{CD}$ at the block 2304, the preset code is retrieved from the code memory 264 through the multiplexer 266 at a block 2305. The received unique code is compared with the preset code at a block 2306. If the unique code does not match the preset code when compared in the block 2306, then the theft-preventing counter may be incremented by one as set forth above and control returns to the main program. On the other hand, if the unique code matches the preset code, then the input level at the input terminal $I_9$ is checked at a block 2307 to see if the door is locked or unlocked. If the input level at the input terminal $I_9$ is still high, indicating that the door is in locked, the control signal is then fed to the relay 240 to drive the reversible motor 302-D in the unlocking direction, at a block 2308. After this block 2308, control returns to the main program. On the other hand, when the input level at the input terminal I9 is low when checked at the block 2307, then the relay 242 is energized at a block 2309 to drive the reversible motor 302-D in the locking direction.

After executing of the block 2309, control passes to the fourth sub-routine illustrated in FIG. 14. In the fourth sub-routine, an initial block 2501 checks to see if any of the the doors are open. In practice, this can be done by checking the input levels at the input terminals I4 and I6. If the input levels at the input terminals I4 and I6 are both high, indicating that all of the doors are closed, then control passes to a block 2502, in which the presence of the ignition key in the key cylinder is checked as in the block 2302 of the second sub-routine of FIG. 12. If the ignition key is in the key cylinder when checked at the block 2502, then the relay 240 is energized to drive the reversible motor 302-D in the unlocking direction at a block 2503. On the other hand, if none of the doors are open when checked at the block 2501 or if the ignition key is not in the key cylinder when checked at the block 2502, control simply returns to the control program.

FIG. 13 shows the third sub-routine which is executed when the driver's door is closed and locked. At the initial stage of execution of the third sub-routine, the presence of the ignition key in the key cylinder is checked for at a block 2401 in substantially the same manner as described with respect to the block 2302 of the second sub-routine of FIG. 12. If the ignition key is there, the demand signal $S_{DM}$ is transmitted to the transmitter 100 for the predetermined period of time, at a block 2402. Then, reception of the unique code signal $S_{CD}$ is checked for at a block 2403. At the same time, the A/D converter 211 is triggered via the output terminal $O_4$ of the microprocessor. After the unique code signal $S_{CD}$ is detected at the block 2403, the input value $V_B$ at the input terminal I2 is read in at a block 2404. The input value at the input terminal I2 is representative of the signal amplitude of the unique code signal. At subsequent block 2405, the amplitude indicative values $V_B$ is stored in an appropriate memory block in RAM. The signal amplitude indicative values $V_A$ and $V_B$ are retrieve and processed to derive their absolute difference $\Delta V$, which is then compared to a reference value $V_{ref}$ at a block 2406. If the difference $\Delta B$ is less than or equal to the reference value $V_{ref}$, then the alarm signal is produced to trigger the alarm actuator 244, at a block 2407. After execution of the block 2409 or in cases where the difference $\Delta V$ is greater than the reference value $V_{ref}$, the timer 276 is reset and restarted at a block 2408. Elapsed time is checked repeatedly at a block 2409 for a given period of time. Thereafter, the demand signal $S_{DM}$ is transmitted to the transmitter once again, at a block 2410. Subsequently, reception of the unique code signal $S_{CD}$ from the transmitter 100 is checked for at a block 2412 following another time check at a block 2411. In practice, the block 2411 checks the elapsed time following transmission of the demand signal $S_{DM}$. Blocks 2413 and 2414 loop until the unique code signal is detected or a predetermined time limit elapses. In the latter case, control passes from block 2411 back to the control program. On the other hand, if the unique code signal is received within the time limit, then the disabling flag $FL_{DSEB}$ is set at a block 2413. As set forth with reference to the second sub-routine of FIG. 12, setting the disabling flag $FL_{DSEB}$ disables the keyless entry system.

FIG. 15 illustrates the fifth sub-routine which is to be executed in response to a low-level input at the input terminal I9 indicative of an unlocked door. When the fifth sub-routine is triggered, the disabling flag $FL_{DSEB}$ is reset at a block 2601, and control returns immediately to the control program.

FIG. 16 illustrates the sixth sub-routine which is to be executed in response to a low-level input at the input terminal I11 caused by depression of the trunk lid lock operating manual switch 202-T. As in the foregoing second sub-routine of FIG. 12, the first block 2701 checks the disabling flag $FL_{DSEB}$. If the disabling flag $FL_{DSEB}$ is set, control returns to the control program. On the other hand, if the disabling flag $FL_{DSEB}$ is reset, the demand signal $S_{DM}$ is transmitted for the predetermined period of time, at a block 2702. At the block 2703, reception of the unique code signal $S_{CD}$ is checked for repeatedly. If the unique code signal is received, the preset code is retrieved from the code memory 264, at a block 2704. The unique code is compared to the preset code at a block 2705. If the unique code matches the preset code, the control signal is fed to the relay 238 to energize the latter to actuate the trunk lid lock actuator 302-T to unlock the trunk lid lock 300-T, at a block 2706. Otherwise, control returns directly to the control program.

FIG. 17 illustrates an interrupt signalling routine triggered by a high-level input at input terminal I3. This routine consists of a single block 2801 in which the interrupt register flag corresponding to the triggering input source is set. Note that some conditions triggering a high-level input may not have corresponding interrupt flags. In practice, this routine may be performed automatically by hard-wired connections.

In the preferred arrangement, a block in which the unique code signal amplitude is read and stored in an appropriate memory block in RAM may be inserted between the blocks 2703 and 2704. Subsequent to execution of the block 2706, a routine substantially the same as the third sub-routine may be executed to prevent the driver from locking the transmitter 100 in the trunk. As was done to enable keyless entry operation in response manual unlocking of the door lock, the keyless entry system may be enabled by manually opening the trunk lid lock.

According to the shown embodiment, when the user leaves the vehicle, at first, he will unlock the door by manually operating the door lock knob in the unlocking direction. Thereafter, the user opens the door in order to get out. At this time, the signal level at the input terminal I4 changes from high to low. This change would be reflected in a set flag in of the register 222-2. Assuming that the user then manually operates the door lock knob to lock the door and closes the door while the door remains locked, the AND gate 272 will output a high-level signal to the input terminal I5. This operation will cause the corresponding flag of the interrupt register 222-2.

In the above case, the first sub-routine of FIG. 11 is first executed in response to the setting of the first-mentioned flag of the register 222-2. After this, the third sub-routine would be executed in accordance with the remaining, set flag. The third sub-routine checks to see if the transmitter is being locked in the vehicle and if so, generates an alarm. Furthermore, if the transmitter remains in the vehicle even after the alarm, the keyless entry system is disabled to prevent theft of the vehicle.

On the other hand, if the user lock the door by means of the keyless entry system, depression of the manual switch 202-D causes the input level at the input terminal $I_{10}$ to change from high to low. In this case, the second sub-routine is triggered. Similarly, when user wants to unlock the door, depression of the manual switch 202-D triggers the second sub-routine to unlock the door lock.

As set forth above, in accordance with the present invention, locking of the transmitter is satisfactorily and successfully prevented by giving an alarm to the user whenever the transmitter is about to be locked in the vehicle. Furthermore, even if the user fails to remove the transmitter from the vehicle despite the alarm, the vehicle is successfully protected from theft by disabling the keyless entry system.

FIGS. 18 to 29 show the second embodiment of the keyless entry system according to the invention. The features and elements substantially same as that of the foregoing first embodiment, will be referred to by the same reference numerals. The fundamental idea of the second embodiment of the keyless entry system of the invention will be discussed with reference to FIG. 2. The manual switch 202 serves to request operation of the vehicle device 300. The controller 200 is responsive to depression of the manual switch 202 to produce a radio signal at a specific frequency which will be hereafter referred to as "demand signal". A demand signal generator 204 in the controller produces the demand signal in response to depression of the manual switch 202. The demand signal is transmitted by a transmitter antenna 206. The transmitter antenna 206 may be mounted on the external surface of the vehicle body near the vehicle device 300 to be operated. For example, if the vehicle device 300 to be operated were the left-front door lock, the transmitteer antenna 206 might then be mounted on the window pane of the left-front door or on a mirror mounted on the left-front door. In practice, the transmitter antenna 206 will be a loop-antenna printed on the chosen area of the vehicle.

The transmitter 100 also has a transmitter/receiver antenna 102 may be a loop-antenna printed on the outer surface of a transmitter casing. The antenna 102 is connected to a receiver circuit 104 of the transmitter 100 to receive the demand signal from the controller. The receiver circuit 104 is, in turn, connected to a unique signal generator 106 which generates a radio signal indicative of a unique combination of several digits in binary code. The radio signal produced by the unique signal generator 106 will be referred to hereafter as "unique code signal". The code indicated by the unique code signal is unique for each transmitter and serves to identify the transmitter 100. The unique code signal of the unique code signal generator 106 is transmitted by the antenna 102.

A receiver 208 with a receiver antenna 210 is provided in the controller to receive the unique code signal from the transmitter 100. The receiver antenna 210 is also mounted on the external surface of the vehicle body near the transmitter antenna 206. The receiver 208 is connected to the demand signal generator 204 and responsive to the demand signal to be activated for a predetermined period of time. In other words, the receiver 208 is active for the predetermined period of time after the demand signal is transmitted. Signals received within the predetermined period of time are converted into binary code signals indicative of any and all digits encoded in the signal as they would be in the transmitter 100. The receiver 208 sends the converted binary code signal to a comparator circuit 212. The comparator circuit 212 includes a memory 214 storing a preset code which matches the unique code of the transmitter 100. The comparator circuit 212 compares the binary-coded digits from the receiver 208 with the preset code and produces a HIGH-level comparator signal when the codes match. A controller 216 including a driver signal generator 216a is responsive to the HIGH-level comparator signal produced by the comparator circuit 212 to produce a driver signal for an actuator 302 in the vehicle device.

In the embodiment shown, the controller 216 is adapted to detect a vehicle condition satisfying a predetermined steering lock condition. In the preferred embodiment, keyless steering lock operation is performed when the vehicle is stopping, engine is stopping and the unique code matching speed sensor 215a and an engine stop condition detector 215b. The vehicle speed sensor 215a produces a vehicle speed indicative signal. On the other hand, the engine stop condition detector is detective of engine stopping to produce an engine stopping state indicative signal. The controller 216 is also connected to a steering lock detector 215c which produces a steering locking condition indicative signal.

In cases where the keyless entry system is adapted to operate more than one vehicle device, the controller 216 is also connected to the manual switches 202 so as to be able to operate the corresponding vehicle devices. The controller 216 recognizes which of the manual switches 202 is operated and sends a driver signal to the actuator of the corresponding vehicle device.

In the aforementioned arrangement, the transmitter 100 uses a small, long-life battery as a power source. In practice, a mercury battery or its equivalent could be used in the transmitter. On the other hand, the controller 216 uses a vehicle battery 218 as a power source. The aforementioned keyless entry system according to the present invention achieves conservation of battery power by being operative only when the manual switch is operated. It would be convenient to provide a weak battery alarm in the system. A suitable weak battery-alarm feature for a keyless entry system has been disclosed in the co-pending U.S. Patent Application Ser. No. 651,783 filed on Sept. 18, 1984, commonly assigned to the assignee of the present invention. The disclosure of this co-pending U.S. Patent Application is hereby incorporated by reference for the sake of disclosure.

The receiver 208 is also connected to a signal detector 280 which detects reception of the unique code signal from the transmitter 100. The signal detector 280 sends a detector signal to a disabling circuit 282 as long as the presence of the unique code signal is detected. The disabling circuit 282 is also connected to a door closure detector 229 and a door lock detecting switch 236. The disabling circuit 282 incorporates a timer 284 for measuring elapsed time from operation or depression of the one of the manual switches 202-D or 202-T. The disabling circuit 282 responds to the presence of the detector signal after a predetermined period of time, given that all of the doors are closed and locked as indicated by the door closure detector and the door lock detecting switch, to produce a disabling signal. The disabling signal disables production of the driver signal by the driver signal generator 216a. On the other hand, while the driver signal generator 216 is disabled, the disabling circuit 282 is responsive to opening of one of the doors to stop the disabling signal and resume keyless entry operation.

In summary, locking the transmitter is recognized to be locked in the vehicle when all of the doors are closed and locked and the unique code signal from the transmitter is received continuously for a period longer than a preset period of time. The preset period of time is determined empirically such that the period is long enough for the user to move out of transmission range but short enough that the user will still be able to hear the alarm indicating that the transmitter is about to be left in the vehicle. In order to enable the user to unlock the door in order to remove the transmitter from the vehicle, the system remains operative for a few minutes, which should be long enough for the user to return to the vehicle and to operate the manual switch for the door lock. If the user fails to notice the alarm and therefore does not operate the keyless entry system to unlock the door and remove the transmitter from the vehicle, the keyless entry system is rendered inoperative after those few minutes to inhibit keyless entry operation until the door is unlocked by means of a mechanical key.

This satisfactorily and successfully prevents the vehicle from being stolen by simple operation of the manual switch while the transmitter is in the vehicle.

Therefore, the invention fulfills all of the object and advantages sought therefor.

What is claimed is:

1. A keyless entry system for an automotive vehicle for operating various vehicle devices including a door lock, comprising:

a portable wireless transmitter adapted to transmit a unique code-indicative radio signal encoded to carry a preset unique code stored in said transmitter;

a controller mounted on the vehicle and receiving the unique code-indicative radio signal, comparing the received unique code with a second preset code, and producing a control signal only when the received unique code matches said second preset code;

a plurality of actuators, each associated with a corresponding plurality of vehicle devices for operating the latter to desired operating states, said actuators including a door lock actuator for operating a vehicular door lock between a locked and an unlocked position;

a plurality of manual switches, each switch actuating said controller for signalling the keyless entry system to operate a corresponding one of said vehicle devices, said manual switches including a door lock switch for reversing the position of said door lock actuator between said locked and unlocked positions;

a first detector for detecting a closed position of a vehicle door;

a second detector for detecting a locked position of said door lock actuator; and a disabling means activated when the vehicle door is closed and the door lock is locked and cyclically or sequentially triggering said transmitter while the vehicle door is closed and the door lock is locked, and responding to continuous or cyclic reception of said unique code-indicative signal for a predetermined period of time from detection of locking of said door lock to disable operation of said controller for operating said door lock actuator, said disabling means responsive to the presence of a user in the vehicle and maintaining said controller disabled when said user is present in the vehicle.

2. A keyless entry system for an automotive vehicle comprising:

vehicle devices including a door lock;

actuators, each associated with and responsive to a corresponding control signal to operate a corresponding vehicle Device to a given operating position, said actuators including a door lock actuator for operating a vehicular door lock between a locked and an unlocked position;

a compact, portable wireless transmitter producing a radio signal indicative of a present unique code in response to reception of a demand signal;

manual switches, each mounted on the external surface of a vehicle body for operation fron outside of the vehicle and operable for initiating operation of the corresponding one of said vehicle devices to a desired state, said manual switches including a door lock switch for reversing the position of said door lock acutator between said locked and unlocked positions;

a controller connected to said manual switches and responsive to operation of one of said manual switches to produce said demand signal, said controller receiving said unique code-indicative radio signal from said transmitter, comparing said unique code to a second preset code stored in said controller, and producing a control signal for operating the one of said actuators corresponding to the operated manual switch, said controller responsive to the closure and locking states of vehicle doors and producing a second demand signal when the vehicle doors are closed and locked, so as to test for transmission and reception of said code-indicative radio signal, said controller producing a disabling signal in response to detection of said code-indicative radio signal following projection of said second demand signal; and a disabling means, associated with said controller and responsive to said disabling signal to disable operation of said controller for operating said door lock actuator.

3. A keyless entry system for an automotive vehicle comprising:

vehicle devices including a door lock which is operable between a locking state and an unlocking state;

a first detector associated with said door lock for detecting the locking and unlocking state of the latter;

a second detector for detecting closure of vehicle doors;

actuators for corresponding vehicle devices, said actuators including a door lock actuator for operating a vehicular door lock between a locked and an unlocked position;

a compact, portable wireless transmitter producing a radio signal indicative of a present unique code in response to reception of a demand signal;

manual switches mounted on an external surface of a vehicle body for operation from the outside of the vehicle, each switch corresponding to one of said vehicle devices, said manual switches including a door lock switch for reversing the position of said door lock actuator between said locked and unlocked positions;

a controller connected to receive a signal from and responsive to operation of one of said manual switches to produce said demand signal, said controller receiving said unique code indicative radio signal from said transmitter, comparing said unique code and a preset code stored therein, and producing a control signal in response to one of said actuators corresponding to an operated manual switch for actuating the corresponding vehicle device to the desired position, said controller being associated with said first and second detector for producing a second demand signal when the vehicle doors are closed and locked in order to test for production of the code-indicative radio signal by said transmitter in the vehice, said controller producing a disabling signal when said code-indicative radio signal is produced in response to said second demand signal; and a disabling means associated with said controller and responsive to said disabling signal to disable operation of said controller for operating said door lock actuator.

4. A keyless entry system for an automotive vehicle comprising:

vehicle devices including a door lock and a trunk lid lock which are each operable between a locking state and an unlocking state;

actuators associated with corresponding vehicle devices including a door lock actuator and trunk lid lock actuator;

a compact, portable wireless transmitter producing a radio signal indicative of a preset unique code in response to reception of a demand signal;

manual switches mounted on the external surface of a vehicle body for operation from the outside of the vehicle, each corresponding to one of said vehicle devices, said manual switches including a door lock switch for reversing the position of said door lock actuator between said locked and unlocked positions;

a controller connected to receive a signal from and responsive to operation of one of said manual switches to produce said demand signal, said controller receiving said unique code indicative radio signal from said transmitter, comparing said unique code and a preset code stored therein to produce a control signal in response to one of said actuators corresponding to an operated manual switch for actuating the corresponding vehicle device, said controller responsive to a first state wherein vehicle doors are closed and locked and a second state wherein said trunk lid is locked, said controller being responsive to one of said first and second states to produce a second demand signal for checking for production of said code-indicative radio signal by said transmitter in the vehicle, and said controller producing a disabling signal when the code-indicative radio signal is produced in response to said second demand signal; and a disabling means responsive to said disabling signal to disable operation of said controller for operating said door lock actuator and trunk lid lock actuator.

5. The keyless entry system as set forth in any one of claims 1 to 4, which further comprises a manual operation mechanism associated with said door lock for allowing manual operation of said door lock between locking and unlocking states.

6. The keyless entry system as set forth in claim 5, which further comprises a detector detecting manual operation of said manual operation mechanism to the locking position.

7. The keyless entry system as set forth in any one of claims 2 to 4, wherein said disabling means includes means for producing an alarm after expiration of a first given period of time following production of said code-indicative radio signal in response to said second demand signal then producing said disabling signal from expiration of a second given period of time thereafter.

8. The keyless entry system as set forth in claim 7, wherein, said second given period of time is substantially longer than said first given period of time.

9. The keyless entry system as set forth in claim 8, wherein the difference between said first and second given periods of time is long enough to allow the user to operate said manual switches again and to remove said transmitter from the vehicle.

10. The keyless entry system as set forth in any one of claims 1 to 4, which further comprises an ignition key detector which detects the presence of an ignition key in a key cylinder and which produces a key indicative signal indicative thereof, and wherein when the vehicle doors are closed and locked, said controller is responsive to said key-indicative signal to disable said disabling means.

11. The keyless entry system as set forth in any one of claims 1 to 4, which further comprises an ignition key detector which detects the presence of an ignition key in a key cylinder and which produces a key indicative signal indicative thereof, and wherein said controller is responsive to said key-indicative signal and operation of said manual switches to disable the keyless entry system.

12. The keyless entry system as set forth in any one of claims 2 to 4, wherein said controller comprises a microprocessor which is programmed to perform the following operations:

a first operation for determining an initial amplitude of said unique code-indicative signal;

a second operation for comparing said unique code with said preset code and outputting said control signal to the actuator of the selected vehicle device when said unique code matches said preset code;

a third operation for determining a second amplitude of said unique code-indicative signal after a predetermined period after production of said second demand signal, comparing said initial amplitude and said second amplitude of said unique code-indicative signal, obtaining the difference therebetween, producing an alarm when said difference is smaller than a predetermined reference value, and disabling said controller after a given period after producing said alarm; and a fourth operation for enabling operation of said controller after a vehicle device is operated manually.

13. The keyless entry system as set forth in claim 12, wherein said microprocessor is responsive to various conditions to selectively perform said first to fourth operations, in which said microprocessor:

selects said first operation in response to the onset of power supply thereto;

selects said second operation in response to operation of one of said manual switches;

selects said third operation in response to production of said second demand signal; and selects said fourth operation in response to manual operation of a vehicle device by means of a mechanical key.

14. The keyless entry system as set forth in claim 13, which further comprises an ignition key detector which detects the presence of an ignition key in an ignition key cylinder and produces a signal indicative of the presence of said ignition key in said key cylinder, and wherein when the vehicle doors are closed and locked, said controller is responsive to said key-indicative signal to disable said disabling means.

15. The keyless entry system as set forth in claim 13, which further comprises an ignition key detector which detects the presence of an ignition key in an ignition key cylinder and produces a signal indicative of the presence of said ignition key in said key cylinder, and wherein said controller is responsive to said key-indicative signal and operation of said manual switches to disable keyless entry operation.

16. In a keyless entry system for operating vehicle devices including a door lock by means of a combination of manual switches mounted on a vehicle body, a wireless, portable transmitter adapted to produce a radio signal indicative of a unique code and a controller mounted on the vehicle for receiving said unique code and for comparing said unique code with a preset code stored in the controller and operating a selected one of the vehicle devices corresponding to the operated one of said manual switches when said codes match, a theft-preventing method comprising the steps of:
 initially activating said transmitter to transmit said unique code-indicative radio signal and measuring an initial signal strength of the unique code-indicative radio signal;
 detecting a first condition in which the vehicle door is closed;
 detecting a second condition in which said door lock has just been operated to a locking state;
 activating said transmitter in response to establishment of said first and second conditions and measuring a second signal strength of said unique code-indicative radio signal;
 comparing said initial signal strength and said second signal strength and deriving the difference therebetween; and
 disabling keyless entry system operation when said difference is smaller than a predetermined reference value after a given period of time expires.

17. In a keyless entry system for operating vehicle devices including a door lock by mean of a combination of manual switches mounted on a vehicle body, a wireless, portable transmitter adapted to produce a radio signal indicative of a unique code and a controller mounted on the vehicle for receiving said unique code and for comparing said unique code with a preset code stored in the controller to operate a vehicle device corresponding to the operated one of said manual switches, a theft preventing method comprising the steps of:
 initially activating said transmitter to transmit said unique code indicative radio signal and measuring an initial signal strength of the unique code-indicative radio signal;
 thereafter performing keyless entry operation in response to operation of said manual switches by comparing said unique code and said preset code and operating the vehicle devices corresponding to the operated one of said manual switches when said codes match;
 detecting a first condition in which the vehicle door is closed;
 detecting a second condition in which said door lock has just been operated to a locking state;
 activating said transmitter in response to establishment of said first and second conditions and measuring a second signal strength of said unique code indicative radio signal;
 comparing said initial signal strength and said second signal strength and deriving the difference therebetween; and
 disabling keyless entry operation when said difference is smaller than a predetermined reference value after a given period of time expires.

18. The method as set forth in claim 16 or 17, which further comprises a step of detecting the presence of an ignition key in an ignition key cylinder of an ignition switch assembly when said first and second conditions are detected and omitting said step of disabling operation of the keyless entry system when the presence of said ignition key in said key cylinder is detected.

19. The method as set forth in claim 16 or 17, which further comprises a step of detecting the presence of an ignition key in an ignition key cylinder of an ignition switch assembly when said first condition is detected and said second condition is not detected, and disabling keyless entry system operation when presence of said ignition key in said key cylinder is detected.

20. The method as set forth in claim 16 or 17, wherein said step of detecting said second condition includes detecting a manual door locking operation by detecting operation of a manually operable door lock knob.

21. The method as set forth in claim 16 or 17, which further comprises a step of producing an alarm when said difference is smaller than said reference value, which alarm producing step is performed in advance of the step of disabling keyless entry system operation.

22. The method as set forth in claim 21, wherein a predetermined time lag is provided between the step for producing said alarm and the step for disabling keyless entry system operation.

23. The method as set forth in claim 22, wherein said time lag is set long enough for the user to operate the keyless entry system and remove the transmitter from the vehicle.

24. A keyless entry system for an automotive vehicle for operating various vehicle devices including a door lock and a steering lock, comprising:
 a portable wireless transmitter operable for transmitting a unique code indicative signal encoded to carry a first preset unique code stored in said transmitter;
 actuators, each associated with corresponding vehicle devices for operating the latter to a desired state, said actuators including a steering lock actuator associated with said steering lock for operating the latter between a locking state and an unlocking state and a door lock actuator for operating a vehicle door lock between a locked and an unlocked position;
 manual switches for signalling said keyless entry system to operate a corresponding one of said vehicle devices;
 a first detector for detecting a door close position for outputting a first detector signal in response thereto;
 a second detector operable for detecting a predetermined steering lock condition to output a second detector signal when said steering lock condition is detected;

a third detector for detecting whether or not a vehicle door or doors is closed;

a fourth detector for detecting whether or not said door lock is locked;

a controller mounted on the vehicle and operable to transmit a first demand signal for triggering said transmitter and receiving said unique code indicative signal, comparing the received unique code with a second preset code, and producing a control signal to operate at least one of said actuators only when the received unique code matches said second preset code, said controller responsive to said first and second detector signals to transmit said control signal to said steering lock actuator for performing steering locking and unlocking operation, said controller detecting the closure and locking state of said vehicle doors to transmit a second demand signal when the vehicle doors are closed and locked, so as to test for transmission of said code-indicative radio signal, said controller producing a disabling signal when said code-indicative radio signal is continuously or periodically received for a given period of time following transmission of said second demand signal; and a disabling means associated with said controller and responsive to said disabling signal for disabling operation of said controller for operating said door lock actuator.

25. The keyless entry system as set forth in claim 24, which further comprises a manual operation mechanism associated with said door lock for allowing manual operation of said door lock between locking and unlocking states.

26. The keyless entry system as set forth in claim 25, which further comprises a detector detecting manual operation of said manual operation mechanism to the locking position.

27. The keyless entry system as set forth in claim 24, wherein said disabling means produces an alarm after expiration of a first given period of time following production of said code-indicative radio in response to said second demand signal and then produces said disabling signal after expiration of a second given period of time thereafter.

28. The keyless entry system as set forth in claim 27, wherein, said second given period of time is substantially longer than said first given period of time.

29. The keyless entry system as set forth in claim 28, wherein the difference between said first and second given periods of time is long enough to allow the user to operate said manual switches again and to remove said transmitter from the vehicle.

30. The keyless entry system as set forth in claims 24, which further comprises an ignition key detector which produces a signal indicative of the presence of an ignition key in a key cylinder when said ignition key is in said ignition key cylinder, and wherein when the vehicle doors are closed and locked, said controller is responsive to said key-indicative signal to disable said disabling means.

31. The keyless entry system as set forth in claim 24, which further comprises an ignition key detector which produces a signal indicative of the presence of an ignition key in a key cylinder when said ignition key is in said ignition key cylinder, and wherein said controller is responsive to said key-indicative signal and operation of said manual switches to disable the keyless entry system.

32. The keyless entry system as set forth any one of in claims 24 to 31, wherein said second detector is detective of an engine stopping and produces said second detector signal when engine stopping is detected.

33. The keyless entry system as set forth in any one of claim 24 to 31, wherein said second detector is detective of a vehicle stopping and produces said second detector signal when the vehicle stopping state is detected.

34. The keyless entry system as set forth in any one of claims 24 to 31, wherein said second detector is detective of an engine stopping and a vehicle stopping and produces said second detector signal when the engine stopping and the vehicle stopping are both detected.

35. The keyless entry system as set forth in any one of claims 24 to 31, wherein said controller is operable for performing a steering locking and unlocking operation, transmits a demand signal to said transmitter and compares the unique code transmitted from said transmitter with said preset code for enabling said steering locking and unlocking operation only when said unique code matches said preset code.

* * * * *